US011922934B2

(12) United States Patent
Luan et al.

(10) Patent No.: US 11,922,934 B2
(45) Date of Patent: Mar. 5, 2024

(54) GENERATING RESPONSE IN CONVERSATION

(71) Applicant: Microsoft Technology Licensing, LLC, Redmond, WA (US)

(72) Inventors: Jian Luan, Beijing (CN); Zhe Xiao, Redmond, WA (US); Xingyu Na, Redmond, WA (US); Chi Xiu, Redmond, WA (US); Jianzhong Ju, Redmond, WA (US); Xiang Xu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 154 days.

(21) Appl. No.: 16/980,332

(22) PCT Filed: Apr. 19, 2018

(86) PCT No.: PCT/CN2018/083735
§ 371 (c)(1),
(2) Date: Sep. 11, 2020

(87) PCT Pub. No.: WO2019/200584
PCT Pub. Date: Oct. 24, 2019

(65) Prior Publication Data

US 2021/0043208 A1 Feb. 11, 2021

(51) Int. Cl.

| | |
|---|---|
| ***G10L 15/22*** | (2006.01) |
| ***G06F 16/9032*** | (2019.01) |
| ***G10L 25/63*** | (2013.01) |

(52) U.S. Cl.
CPC ........ *G10L 15/22* (2013.01); *G06F 16/90332* (2019.01); *G10L 25/63* (2013.01); *G10L 2015/227* (2013.01)

(58) Field of Classification Search
CPC .......... G10L 15/22; G10L 25/26; G10L 25/63
See application file for complete search history.

(56) References Cited

U.S. PATENT DOCUMENTS 6,795,808 B1 * 9/2004 Strubbe ............. G06F 16/90332 704/E15.04
9,812,151 B1 * 11/2017 Amini ..................... G06T 13/40
(Continued)

FOREIGN PATENT DOCUMENTS

CN 101226742 A 7/2008
CN 104616666 A 5/2015
(Continued)

OTHER PUBLICATIONS

"International Search Report and Written Opinion Issued in PCT Application No. PCT/CN2018/083735", dated Jan. 3, 2019, 9 Pages.

(Continued)

*Primary Examiner* — Douglas Godbold
(74) *Attorney, Agent, or Firm* — Schwegman Lundberg & Woessner, P.A.

(57) ABSTRACT

The present disclosure provides method and apparatus for generating a response in a human-machine conversation. A first sound input may be received in the conversation. A first audio attribute may be extracted from the first sound input, wherein the first audio attribute indicates a first condition of a user. A second sound input may be received in the conversation. A second audio attribute may be extracted from the second sound input, wherein the second audio attribute indicates a second condition of a user. A difference between the second audio attribute and the first audio attribute is determined, wherein the difference indicates a condition change of the user from the first condition to the
(Continued)

second condition. A response to the second sound input is generated based at least on the condition change.

17 Claims, 15 Drawing Sheets

(56) References Cited

U.S. PATENT DOCUMENTS

| | | | | |
|---|---|---|---|---|
| 10,135,979 | B2* | 11/2018 | Zimmerman | G06F 40/30 |
| 10,192,569 | B1* | 1/2019 | Indyk | G10L 25/48 |
| 2006/0122840 | A1* | 6/2006 | Anderson | G10L 13/033 704/E15.04 |
| 2011/0196677 | A1* | 8/2011 | Deshmukh | G10L 15/22 704/E15.001 |
| 2013/0030812 | A1* | 1/2013 | Kim | G10L 15/22 704/E11.001 |
| 2014/0140497 | A1* | 5/2014 | Ripa | H04M 3/5175 379/265.06 |
| 2014/0220526 | A1* | 8/2014 | Sylves | G06Q 10/06395 434/238 |
| 2015/0371627 | A1 | 12/2015 | Lee et al. | |
| 2017/0084295 | A1* | 3/2017 | Tsiartas | G10L 17/08 |
| 2017/0310820 | A1* | 10/2017 | Kao | G10L 25/63 |
| 2018/0024991 | A1 | 1/2018 | Baldwin et al. | |
| 2018/0061415 | A1* | 3/2018 | Penilla | G10L 15/02 |
| 2018/0082679 | A1* | 3/2018 | McCord | G10L 13/033 |
| 2018/0218639 | A1* | 8/2018 | Ryuzaki | G10L 15/22 |
| 2018/0366121 | A1* | 12/2018 | Funazukuri | G10L 25/63 |
| 2019/0043511 | A1* | 2/2019 | Zhang | G06V 40/172 |
| 2019/0050875 | A1* | 2/2019 | McCord | G06F 40/30 |
| 2019/0130910 | A1* | 5/2019 | Kariya | G10L 25/63 |
| 2019/0188261 | A1* | 6/2019 | Herzig | G06F 40/30 |
| 2019/0213400 | A1* | 7/2019 | Kim | G06V 40/20 |
| 2019/0276037 | A1* | 9/2019 | Ito | G08G 1/16 |
| 2019/0279629 | A1* | 9/2019 | Okamoto | G06F 40/20 |
| 2019/0325866 | A1* | 10/2019 | Bromand | G06F 3/167 |
| 2019/0325867 | A1* | 10/2019 | Bromand | G10L 15/22 |
| 2019/0325896 | A1* | 10/2019 | Bromand | G10L 15/22 |
| 2020/0043514 | A1* | 2/2020 | Liu | G10L 15/16 |
| 2020/0152197 | A1* | 5/2020 | Penilla | G10L 25/63 |
| 2020/0302953 | A1* | 9/2020 | Ando | G10L 25/30 |
| 2020/0349938 | A1* | 11/2020 | Hwang | G06F 40/30 |

FOREIGN PATENT DOCUMENTS

| | | | |
|---|---|---|---|
| CN | 106373569 | A | 2/2017 |
| CN | 106910513 | A | 6/2017 |
| CN | 107636648 | A | 1/2018 |
| EP | 1531458 | A1 | 5/2005 |
| JP | 2015082093 | A | 4/2015 |
| WO | 2017112496 | A1 | 6/2017 |

OTHER PUBLICATIONS

"Extended Search Report Issued in European Patent Application No. 18915693.8", dated Oct. 1, 2021, 8 1 Pages.
"First Office Action and Search Report Issued in Chinese Patent Application No. 201880042016.5", dated Feb. 11, 2023, 21 Pages.
"Office Action and Search Report Issued in Chinese Patent Application No. 201880042016.5", dated Oct. 7, 2023, 16 Pages.
"Notice of Allowance Issued in European Patent Application No. 18915693.8", dated Sep. 28, 2023, 8 Pages.

* cited by examiner

GENERATING RESPONSE IN CONVERSATION

CROSS-REFERENCE TO RELATED APPLICATION

This application is a U.S. National Stage Filing under 35 U.S.C. 371 of International Patent Application Serial No. PCT/US2018/083735, filed Apr. 19, 2018, and published as WO 2019/200584 A1 on Oct. 24, 2019, which application and publication are incorporated herein by reference in their entirety.

BACKGROUND

Artificial Intelligence (AI) chatbots are becoming more and more popular, and are being applied in an increasing number of scenarios. The chatbot is designed to simulate conversation with a human, and may chat with users by text, speech, image, etc. Generally, the chatbot may scan for keywords within a message input by a user or apply natural language processing on the message, and provide a response with the most matching keywords or the most similar wording pattern to the user.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for generating response in a human-machine conversation. A first sound input may be received in the conversation. A first audio attribute is extracted from the first sound input, wherein the first audio attribute indicates a first condition of a user. A second sound input may be received in the conversation. A second audio attribute is extracted from the second sound input, wherein the second audio attribute indicates a second condition of a user. A difference between the second audio attribute and the first audio attribute is determined, wherein the difference indicates a condition change of the user from the first condition to the second condition. A response to the second sound input is generated based at least on the condition change.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
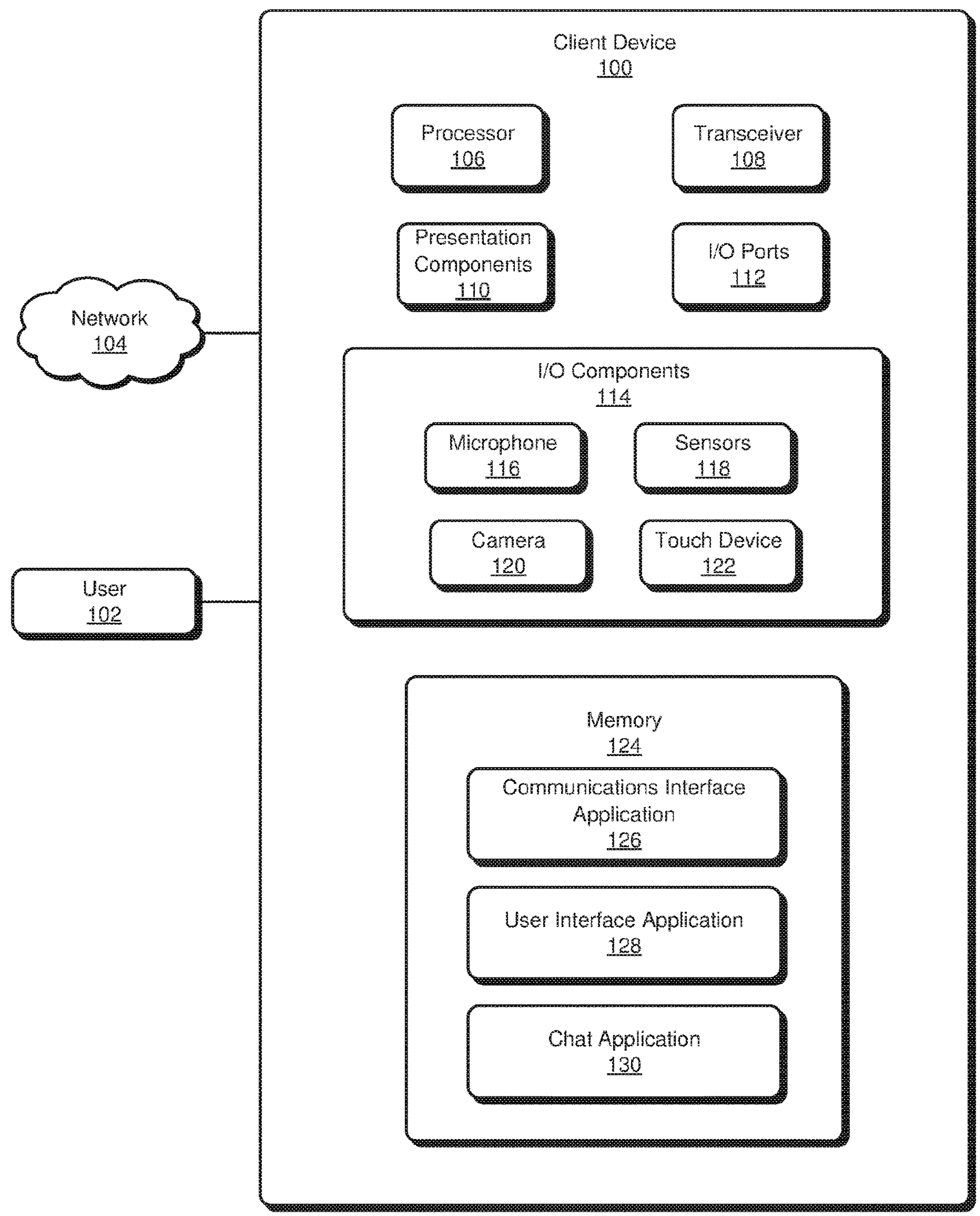
FIG. 1 is a block diagram illustrating an exemplary client device for collecting and providing user data and environment data according to an embodiment.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Examples disclosed herein are directed to methods, apparatus comprising several modules and apparatus comprising one or more processors and a memory embodied with executable instructions for providing an interactive chat engine on a smart phone, mobile tablet, networked toy, car computer, or other client device. Using the disclosed examples, a client device is equipped with a chat engine that can understand and interpret condition change of a user in order to generate a response based at least on the condition change of the user. A "chat engine" refers to the entire device and software components for presenting the chat conversation to the user, including frontend user experience, middle chat response software, and backend databases of data used to present chat responses. Herein, the chat engine may also be referred to as a "chatbot". The condition change of the user may indicate a change from the user's one condition to another condition, comprising an emotion condition change of the user from a first emotion condition to a second emotion condition, an environment condition change of the user from a first environment condition to a second environment condition, a physical status condition change of user from a first physical status condition to a second physical status condition, etc. In an embodiment, a condition of the user may be indicated by an audio attribute extracted from a sound input, and a condition change of the user may be indicated by a difference between a second audio attribute and a first audio attribute. The condition of the user may be determined, in some examples, through the interpretation of text, video, image, sound, touch, or other information captured on the client device from the user.

Herein, the condition of the user may be determined mainly through the interpretation of sound, such as speech, noise and so on, captured on the client device. In embodiments of the present disclosure, the emotion condition may be detected through the interpretation of acoustic features of speech captured from the user. For example, the acoustic features of speech may include one or more of tone, loudness, pitch, fundamental frequency, Mel-frequency Cepstral Coefficients (MFCC), formant, glottal wave, short-time energy, zero-crossing rate, short-time magnitude, speed, pause, and so on, For example, a change of tone of a user's speech may indicate that the user become exciting now, speaking very loudly may indicate that the user is in an angry condition, or the like. In embodiments of the present disclosure, the environment condition may be determined through the interpretation of environment noise captured on the client device. For example, family noise, such as TV sound, may indicate that the user is at home; bus noise, such as a sound about selling ticket or about a station name may indicate that the user is on the bus, or the like. In embodiments of the present disclosure, the physical status condition may be determined through the interpretation of human-made noise from the user. For example, coughing may indicate that the user has a cold, yawning may indicate that the user is sleepy, or the like.

Emotion condition may include any designation of emotion, such as, neutral, happy, angry, sad, fear, surprise, or other categories of emotion. Emotion condition may also include various levels of emotions, for example, various levels of ecstasy, elation, cheerfulness, serenity, delight corresponding to "happy"; various levels of vigilance, curiosity, interest, expectancy, attentiveness anticipation; various levels of terror, panic, fright, dismay, apprehension, timidity corresponding to "fear"; various levels of astonishment, amazement, uncertainty, distraction corresponding to "surprise"; various levels of grief, sorrow, dejection, gloominess, pensiveness corresponding to "sad"; various levels of loathing, revulsion, aversion, dislike, boredom corresponding to "disgust"; various levels of fury, rage, hostility, annoyance corresponding to "angry"; various levels of admiration, acceptance, tolerance corresponding to "trust"; and so on.

To create an intelligent chat engine, the examples disclosed herein capture various relevant user and environment data included in a sound input on the client device, communicate the captured user and environment data to a chat engine server for determining one or more of the user's emotion condition change, environment condition change and the user's physical status condition change, generating a chat response based at least on the user's emotion condition change, environment condition change and the user's physical status condition change, and present the generated chat response to the user.

In some examples, a user's input data and environment data are analyzed, either by a client device or by a chat engine server to determine the user's condition change. Herein, the user's input data and environment data may be in a form of sound to be inputted into the client device. Chat responses for interacting with the user in conversation are generated using a response generation module that accesses various indexes of information based on user input and environment data. A conversation module may be used to select one of the generated responses to be provided to a user in a form of text message, speech message, image message, or video message, taking into account the user's detected condition change and/or some other factors, for example, the user's detected condition, and semantic information extracted from the user input, conversation context, user profile, and so on.

The selected or generated responses are tailored based on the condition change of the user in order to provide a more communicative and more intelligent chat experience than conventional digital assistants. Again, today's digital assistants do not take into account the condition change of the user. Using the various examples disclosed herein, chat responses may specifically fit the user's condition change. For example, when the user's emotion condition is changed from angry to neural, certain chat responses will be used, e.g., "you are not so angry now, are your?" or "you are better now, let's play a new game". Intelligent chat responses enhance the user experience by providing a more proactive way to communicate with users on a client device.

In this disclosure, a "chat", "conversation" or "chat conversation" refers to an electronic interaction between a user and a computing device, such as, a sequence of exchanged text, video, image, sound, etc. For example, an avatar presented on a computer screen may speak, present text, or carry out animations with a user.

To determine a user's condition change, some examples may capture an input data on a client device and communicate the captured input data to a chat engine server. The input data may include a sound input, which comprises user data and environment data. Example of the user data may include, without limitation, speech and other audio from the user. Herein, "environment data" refers to information relating to a user's surrounding environment, location, or other activity being performed, as captured by one or more sensors or electrical components of a computing device. For example, environment data may include information detected from a microphone of a client device such as, but without limitation, background noise of an audio recording, speech from other users in an audio recording. For example, a street noise may be received through the microphone and it may be used to determine that the user's location, such as on the street, and so forth. Environment data may also include information retrieved from the user's input data, for example, but without limitation, the user's input data may comprise information of the street where the user is standing now, such as "I am on Happy Street". In some examples, environment data is identified in the sound input data by a chat engine server receiving the input data from a client device over a network. In alternative examples, the environment data may be parsed from the input data by the client device and sent to the chat engine server separately.

Herein, a "user profile" refers to an electronically stored collection of information related to the user. Such information may include the user's name, age, gender, height, weight, demographics, current location, residency, citizenship, family, friends, schooling, occupation, hobbies, skills, interests, Web searches, health information, birthday, anniversary, celebrated holidays, moods, user's condition, and any other personalized information associated with the user. The user profile includes static profile elements, e.g., name, birthplace, etc., and dynamic profile elements that change over time, e.g., residency, age, condition, etc. The user profile may be built through probing questions to the user or through analyzing the user's behavior on one or more client devices.

As disclosed in more detail below, condition change for users may be determined based on the user data and/or environment data. In some examples, the chat engine server may use the user data and/or the environment data to determine the condition change of the user, and then use the condition change to influence the chat responses provided to the user.

Having generally provided an overview of some of the disclosed examples, attention is drawn to the accompanying drawings to further illustrate some additional details. The illustrated configurations and operational sequences are provided to aid the reader in understanding some aspects of the disclosed examples. The accompanying figures are not meant to limit all examples, and thus some examples may include different components, devices, or sequences of operations while not departing from the scope of the disclosed examples discussed herein. In other words, some examples may be embodied or may function in different ways than those shown.

Aspects of the disclosure create a better chat user experience by tailoring chat responses to the user's condition change. Understanding the user's condition change and tailoring chat messages accordingly drastically expands the capabilities of conventional computing devices, providing a platform where intelligent applications can exist.

Referring to FIG. 1, a block diagram illustrates an exemplary client device 100 for collecting and providing user and environment data. In some examples, the client device 100 has at least one processor 106, a transceiver 108, one or more presentation components 110, one or more input/output (I/O) ports 112, one or more I/O components 114, and a memory 124.

The client device 100 may take the form of a mobile computing device or any other portable device, such as, a mobile telephone, laptop, tablet, computing pad, notebook, gaming device, portable media player, etc. The client device 100 may also include less portable devices such as desktop personal computers, kiosks, tabletop devices, industrial control devices, wireless charging stations, electric automobile charging stations, etc. Further still, the client device 100 may alternatively take the form of an electronic component of a vehicle, e.g., a vehicle computer equipped with microphones or other sensors; an electronically equipped toy, e.g., a stuffed animal, doll, or other child character equipped with the electrical components disclosed herein; or any other computing device. Other examples may incorporate the client device 100 as part of a multi-device system in which two separate physical devices share or otherwise provide access to the illustrated components of the computing device 100.

The processor 106 may include any quantity of processing units, and is programmed to execute computer-executable instructions for implementing aspects of the disclosure. The instructions may be performed by the processor or by multiple processors within the computing device, or performed by a processor external to the computing device. In some examples, the processor 106 is programmed to execute method such as illustrated in accompanying FIG. 15. Additionally or alternatively, some examples may make the processor 106 programmed to present a chat experience in a user interface ("UI"), e.g., the UI shown in FIGS. 4, 8, 9, 11, 13, 14. Moreover, in some examples, the processor 106 may represent an implementation of analog techniques to perform the operations described herein. For example, the operations may be performed by an analog client device 100 and/or a digital client device 100.

The transceiver 108 is an antenna capable of transmitting and receiving radio frequency ("RF") signals. One skilled in the art will appreciate and understand that various antenna and corresponding chipsets may be used to provide communicative capabilities between the client device 100 and other remote devices. Examples are not limited to RF signaling, however, as various other communication modalities may alternatively be used.

The presentation components 110 visibly or audibly present information on the computing device 100. Examples of presentation components 110 include, without limitation, computer monitors, televisions, projectors, touch screens, phone displays, tablet displays, wearable device screens, televisions, speakers, vibrating devices, and any other devices configured to display, verbally communicate, or otherwise indicate chat responses to a user. In some examples, the client device 100 may be a smart phone or a mobile tablet that includes speakers capable of playing audible chat responses to the user. In other examples, the client device 100 is a computer in a car that presents audio chat responses through a car speaker system, visual chat responses on display screens in the car, e.g., situated in the car's dashboard, within headrests, on a drop-down screen, or the like, or a combination thereof. Other examples may present the disclosed chat responses through various other display or audio presentation components 110.

I/O ports 112 allow the client device 100 to be logically coupled to other devices and I/O components 114, some of which may be built into client device 100 while others may be external. Specific to the examples discussed herein, I/O components 114 include a microphone 116, one or more sensors 118, a camera 120, and a touch device 122. The microphone 116 captures speech from the user 102. The sensors 118 may include any number of sensors on or in a mobile computing device, electronic toy, gaming console, wearable device, television, vehicle, or other computing device 100. Additionally, the sensors 118 may include an accelerometer, magnetometer, pressure sensor, photometer, thermometer, global positioning system ("GPS") chip or circuitry, bar scanner, biometric scanner for scanning fingerprint, palm print, blood, eye, or the like, gyroscope, near-field communication ("NFC") receiver, or any other sensor configured to capture data from the user 102 or the environment. The camera 120 captures images or video of the user 102. The touch device 122 may include a touchpad, track pad, touch screen, or other touch-capturing device. The illustrated I/O components 114 are but one example of I/O components that may be included on the client device 100. Other examples may include additional or alternative 110 components 114, e.g., a sound card, a vibrating device, a scanner, a printer, a wireless communication module, or any other component for capturing information related to the user or the user's environment.

The memory 124 includes any quantity of memory associated with or accessible by the computing device 100. The memory 124 may be internal to the client device 100, as shown in FIG. 1, external to the client device 100, not shown in FIG. 1, or both. Examples of memory 124 may include, without limitation, random access memory (RAM), read only memory (ROM), electronically erasable programmable read only memory (EEPROM), flash memory or other memory technologies, CDROM, digital versatile disks (DVDs) or other optical or holographic media, magnetic cassettes, magnetic tape, magnetic disk storage or other magnetic storage devices, memory wired into an analog computing device, or any other medium for encoding desired information and for access by the client device 100. Memory 124 may also take the form of volatile and/or nonvolatile memory; may be removable, non-removable, or a combination thereof; and may include various hardware devices, e.g., solid-state memory, hard drives, optical-disc drives, etc. Additionally or alternatively, the memory 124 may be distributed across multiple client devices 100, e.g., in a virtualized environment in which instruction processing is carried out on multiple client devices 100. The memory 124 stores, among other data, various device applications that, when executed by the processor 106, operate to perform functionality on the computing device 100. Examples of applications may include chat applications, instant messaging applications, electronic-mail application programs, web browsers, calendar application programs, address book application programs, messaging programs, media applications, location-based services, search programs, and the like. The applications may communicate with counterpart applications or services such as web services accessible via the network 104. For example, the applications may include client-operating applications that correspond to server-side applications executing on remote servers or computing devices in the cloud.

Specifically, instructions stored in memory 124 comprise a communications interface application 126, a user interface application 128, and a chat application 130. In some examples, the communications interface application 126 includes computer-executable instructions for operating a network interface card and/or a driver for operating the network interface card. Communication between the client device 100 and other devices may occur using any protocol or mechanism over a wired or wireless connection, or across the network 104. In some examples, the communications interface application 126 is operable with RF and short-range communication technologies using electronic tags, such as NFC tags, Bluetooth® brand tags, or the like.

In some examples, the user interface application 128 includes a graphics application for displaying data to the user and receiving data from the user. The user interface application 128 may also include computer-executable instructions for operating the graphics card to display chat responses and corresponding images or speech on or through the presentation components 110. The user interface application 128 may also interact with the various sensors 118 to both capture and present information through the presentation components 110.

The chat application 130, when executed, may present chat responses through the presentation components 110. In some examples, the chat application 130, when executed, retrieves user data and environment data captured through the I/O components 114 and communicates the retrieved user and environment data over the network to a remote server. The remote server, in some examples, operates a server application configured to identify user emotion condition change, and/or physical status condition change, and/or environment condition change from the communicated user data and environment data, generate chat responses that are tailored to the condition change, and communicate the chat responses back to the client device 100 for displaying through the presentation components 110. In other examples, the chat application 130 may include instructions for determining the condition change of the user 102 on the client device 100—instead of making such determinations on a remote server. Determination of the condition change of the user 102 may be performed—either by the chat application 130 or a server—through tone or frequency analysis of a user's input data, human-made noise analysis of a user's input data, environment noise analysis of an environment input data, and the like.

When condition changes of the user are determined on the client device 100, some examples may communicate the determined condition changes to a server, either separately or along with the user's previous and/or current conditions, semantic information extracted from the sound input, also captured on the client device 100, for use in selecting tailored chat responses. For example, a condition change indicating that the emotion condition of the user 102 is changed from neutral to happiness, the physical status condition of the user 102 is changed from normal to coughing, and/or the environment condition is changed from home noise to street noise—either weighted or not—may be transmitted along with the user's semantic information, for example, "I am glad to go shopping with my friend". In response, a receiver server may generate or select an appropriate response based on the emotion condition change, physical status condition change of the user, the environment condition change and the user's semantic information in his/her speech.

Additionally or alternatively, the environment data captured by the components 114 may also be analyzed, either by the client device 100 or a remote server, to determine various environment events happening around the user. Background noise may be analyzed to garner information about the surroundings of the user 102. For example, a sound as "the flight XXX will take off at 10 minutes later" in the background, and/or a speech as "our boarding gate is at gate 5" from other people may be recognized and used to indicate that the user is at the airport. In another example, some people talking about goods and price in the background may be recognized and may indicate that the user is in a market. In still another example, a bell ringing for class may be received and analyzed to indicate that the user is at school. Numerous other examples may interpret environment data in different, alternative, or additional ways to better understand the surroundings and environment condition of the user 102.

While discussed in more depth below, some examples also build and maintain a user profile for the user 102. To prepare or maintain up-to-date user profiles, the chat application 130 or a chat server may be configured to periodically, responsively, e.g., after certain user interactions, spontaneously, or intermittently probe the user 102 with questions to gather information about the user 102. For example, the chat application 130—either alone or upon direction of the chat server—may initially ask the user 102 for certain static non-changing information, e.g., birthday, birthplace, parent or sibling names, etc., and current information that is more dynamic in nature, e.g., residence, current mood, best friend, current physical status, location, etc. For the latter, i.e., dynamic information, the chat application 130 may probe the user 102 in the future or analyze chat conversations with the user 102 for changes to the dynamic information—to ensure such information does not go stale. For example, if a user profile previously indicated that a user 102 lives in Seattle two years ago, and the chat application 130 recognizes that the client device 100 is spending more than a threshold amount of time, e.g., days a year, hours a week, etc. in Houston, Tex., the chat application 130 may be configured or directed by a chat server to ask the user 102 whether he or she lives in a new location. Such questions may be triggered by user input data, a lapse in time, detected environment data, conditions of the user 102, or any other trigger.

Figure 2:
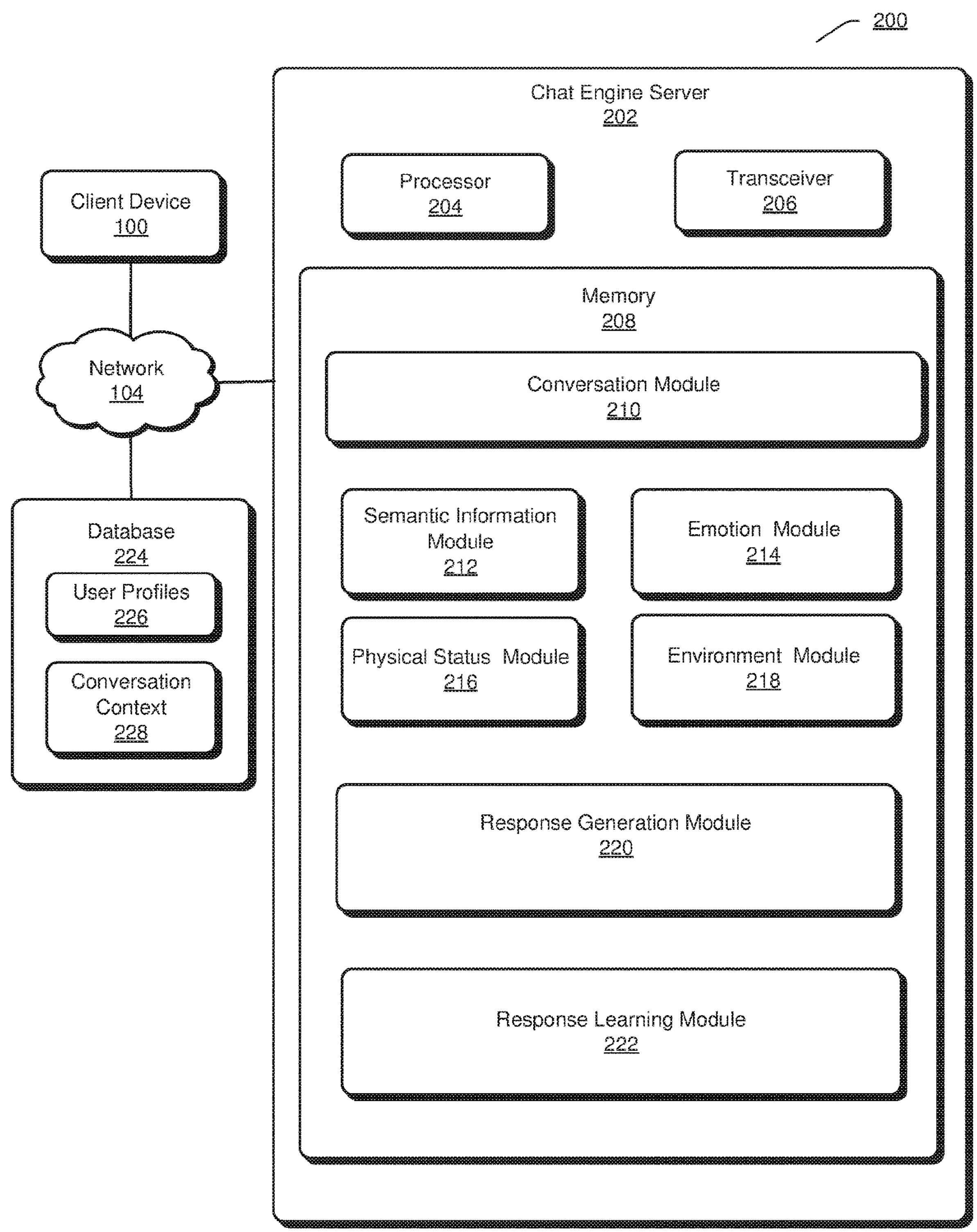
FIG. 2 is a block diagram of a networking environment for providing an intelligent chat engine on client device according to an embodiment.

FIG. 2 is a block diagram of a networking environment 200 for providing an intelligent chat engine on client devices 100. The networking environment 200 may include multiple client devices 100, just one shown in FIG. 2, a chat engine server 202, and a database 224 communicating over a network 104. In some examples, user and environment data are communicated by the client devices 100 over the network 104 to the chat engine server 202, and the chat engine server 202 generates tailored chat responses that are provided back to the client devices 100 for presentation as part of a chat conversation to their respective users 102. The networking environment 200 shown in FIG. 2 is merely an example of one suitable computing system environment and is not intended to suggest any limitation as to the scope of use or functionality of examples disclosed herein. Neither should the illustrated networking environment 200 be interpreted as having any dependency or requirement related to any single component, module, index, or combination thereof.

The network 104 may include any computer network, for example the Internet, a private network, local area network (LAN), wide area network (WAN), or the like. The network 104 may include various network interfaces, adapters, modems, and other networking devices for communicatively connecting the client devices 100, the chat engine server 202, and the database 224. The network 104 may also include configurations for point-to-point connections. Computer networks are well known to one skilled in the art, and therefore do not need to be discussed in detail herein.

The client devices 100 may be any type of client device discussed above in reference to FIG. 1. Each client device 100 may capture user and/or environment data from their respective users and communicate the captured user and environment data over the network 104 to the chat engine server 202 and/or the database 224. To do so, each device may be equipped with a communications interface application 126, as discussed above in reference to FIG. 1. In response, the chat engine server 202 may be capable of providing intelligent chat responses in a chat experience to many client devices 100 capable of communicating their respectively captured user and environment data over the network 104. Put another way, the chat engine server 202 may control chat engine conversations on client devices 100.

The client device 100 may be equipped with various software applications and presentation components 110 for presenting received chat responses to their respective users. For example, the mobile phone may present a virtual assistant or a chatbot on a screen and the corresponding audio through a speaker. The chatbot may present text or animations on a screen and/or audio through a speaker and may use any form of text message, image message, audio message, video message and/or any combination thereof to present the chat responses. The illustrated client devices and the aforesaid presentation mechanisms are not an exhaustive list covering all examples. Many different variations of client devices 100 and presentation techniques may be used to the convey chat responses to users.

The chat engine server 202 represents a server or collection of servers configured to execute different web-service computer-executable instructions. The chat engine server 202 includes a processor 204 to process executable instructions, a transceiver 206 to communicate over the network 104, and a memory 208 embodied with at least the following executable instructions: a conversation module 210, a response generation module 220, and a response learning module 222. The memory 208 may include instructions for semantic information module 212, an emotion module 214, a physical status module 216, and an environment module 218, While chat engine server 202 is illustrated as a single box, one skilled in the art will appreciate that the chat engine server 202 may, in fact, be scalable. For example, the chat engine server 202 may actually include multiple servers operating various portions of software that collectively generate chat responses and control chat conversations on the client devices 100.

The database 224 provides backend storage of Web, user, and environment data that may be accessed over the network 104 by the chat engine server 202 or the client devices 100 and used by the chat engine server 202 to generate chat responses. The Web, user, and environment data stored in the database includes, for example but without limitation, user profiles 226, conversation context 228 and so on. Additionally, though not shown for the sake of clarity, the servers of the database 224 may include their own processors, transceivers, and memory. Also, networking environment 200 depicts the database 224 as a collection of separate devices from the chat engine server 202; however, examples may actually store the discussed Web, user, and environment data shown in the database 224 on the chat engine server 202.

More specifically, the user profiles 226 may include any of the previously mentioned static and dynamic data parameters for individual users. Examples of user profile data include, without limitation, a user's age, gender, race, name, location, parents, likes, interests, Web search history, Web comments, social media connections and interactions, online groups, schooling, location, birthplace, native or learned languages, proficiencies, purchase history, routine behavior, jobs, religion, medical data, employment data, financial data, previous or initial emotion condition, previous or initial physical status condition, previous or initial environment condition, or virtually any unique data point specific to the user. The user profiles 226 may be expanded to encompass various aspects of a user's life. In some examples, the user profile 226 may include data received from a variety of sources, such as web sites containing blogs, comment sections, etc., mobile applications, or other sources. As with the types of data that may be included in the user profiles 228, the sources of such information are deeply expansive as well.

The conversation context 228 may include chat conversations with the user in response to proactive or reactive questioning of the chat engine, chat conversations with the user's online connections, chat conversations with similarly profiled users, conversation log, or other information assocaition with conservation of the user.

In operation, users engage the client devices 100, which may proactively or reactively capture user and/or environment data from the users or their surroundings. In some examples, the client devices 100 may be configured to proactively probe the users for information by asking questions about the users' emotion condition, physical status condition, surroundings, experiences, or information that may be used to build or keep the user profiles 226. For example, a client device 100 may capture images of the user, receive speech of the user, read various sensors, or ask the user probing questions. Additionally or alternatively, the client devices 100 may reactively capture the user and environment data upon engagement of interaction with the user. For example, a user may ask a question, open a chat engine application, or otherwise engage the chat application 130, prompting the client device 100 to capture corresponding user and/or environment data. Whether proactively or reactively obtained, user and environment data captured on the client devices 100 may be transmitted to the chat engine server 202 for generation of appropriate chat conversation responses. Additionally or alternatively, some or all of the captured user and environment data may be transmitted to the database 224 for storage. For example, information that is related to a user's profile or conversation gathered by the chat application 130 on the client device 100 may be stored on the database 224.

The chat engine server 202 controls chat conversations on the client devices 100 based on the user and/or environment data received from the client devices 100, the data in the database 224, emotion condition change of the user, physical status condition change of the user, environment condition change around the user, or a combination thereof. To this end, in some examples, a semantic information module 212 may be used to determine the user's semantic information in the user's speech, the emotion module 214 may be used to determine the user's previous and current emotion condition and thus the emotion condition change, the physical status module 216 may be used to determine the user's previous and current physical status condition and thus the physical status condition change, and the environment module 218 may be used to determine the user's previous and current environment condition and thus the environment condition change. Additionally, a response generation module 220 may be used to generate chat responses to be provided to the client devices 100. The response generation module 220 may take into account the determined condition change of the users when selecting or generating chat responses, including emotion condition change of the user, physical status condition change of the user and/or environment condition change around the user. Alternatively or additionally, in some examples, the response learning module 222 provides rules or other conditions for moving users from one condition, e.g., sad, to another condition, e.g., happy, based on historical learning from previous chat conversations and corresponding condition. Using the techniques, modules, and components disclosed. herein, the chat engine server 202 can provide the client devices 100 with conversational chat responses based on the user's condition change and/or one or more of the user's semantic information, user's previous and/or current condition, conversation context, user profile and so on.

In some examples, the emotion module 214 determines the emotion condition and/or the emotion condition change of the user by analyzing the user data received from the client device 100. To do so, the emotion condition and/or emotion condition change for users may be determined based on the user data, for example, based on audio attribute extracted from the user data, either alone or in combination with audio attribute extracted from the captured environment data. The emotion module 214 may execute instructions for analyzing the tone, frequency, pitch, amplitude, vibrato, reverberation, or other acoustic features of a user's speech in order to determine the user's emotion condition. Moreover, the user's speech may be translated by the emotion module 214 into text or audibly recognized content of what the user is saying, and the user's recognized words or phrases may be interpreted by the emotion module 214 to understand the user's emotion condition.

In some examples, the physical status module 216 determines the physical status condition and/or the physical status condition change of the user by analyzing the user data received from the client device 100. To do so, the physical status condition and/or physical status condition change for users may be determined based on the user data, for example, based on audio attribute extracted from user data, either alone or in combination with audio attribute extracted from the captured environment data. The physical status module 216 may execute instructions for analyzing a human-made noise by the user, such as sneezing, coughing, sniffling, yawning, or other features, in order to determine the user's physical status condition. Moreover, the user's speech may be translated by the physical status module 216 into text or audibly recognized content of what the user is saying, and the user's recognized words or phrases may be interpreted by the physical status module 216 to understand the user's physical status condition.

The environment module 218 analyzes environment data in a sound input from the client devices 100 to determine the user's environment condition and thus the environment condition change. The environment noise in the sound input may be analyzed to determine what is going on around the user. For example, environment noise captured along with user's speech may reveal to the environment module 218 that the user is outdoors, at a particular location, or surrounded by particular quantities or identifiable people, e.g., father, brother, etc.

In some examples, the conversation module 210 manages the chat conversation of the client device 100 remotely from the chat engine server 202. In this case, the conversation module 210 may receive the user and environment data from client devices 100 through a sound input, and provide chat responses selected from the response generation module 220 back to the client devices 100.

In some examples, the response learning module 222 includes instructions operable for implementing a Markov decision process reinforcement-learning model. In some examples, the response learning module 222 uses different condition changes made up of emotion, and/or physical status and/or environment condition changes; actions made up of chat responses, e.g., responses to encourage a user, responses to sympathize with a user, responses to seem understanding to the user, and the like; and rewards made up of desired changes in conditions, e.g., emotion condition from sad to happy, physical status condition from normal to having a cold, environment condition from home noise to street noise. The response learning module 222 may then calculate the likelihood of achieving the rewards, e.g., desired condition changes, based on the different combinations of condition changes and actions achieving the rewards with this or other users in the past. Then, the response most likely able to achieve the condition changes may be selected by the response learning module 222.

The response generation module 220 includes instructions operable to generate chat responses based on the user data, environment data, and condition change of the user. In some examples, the response generation module 220 executes a multi-layer generation application. The multi-layer generation application may represent instructions for different levels of focus of analysis of a user's semantic information or question on a client device 100, and the multi-layered generation application may access the disclosed information stored in the database 224 to provide chat responses mentioned herein. For a given user input, the response generation module 220 may proceed through several different layers to generate one or more possible chat responses.

In some examples, the response generation module 220 sequentially processes semantic information through the several different layers until a chat response is generated or identified, and the generated or identified chat response is provided back to the client device 100. For example, if the response generation module 220 identifies a chat response based on the condition change of the user, the conversation module 210 transmits that chat response to the client device without having to process a user's semantic information. In this manner, the response generation module 220 operates as a filtering model that uses different layers to come up with a chat response.

Additionally or alternatively, the response generation module 220 may generate possible chat responses to use in a chat conversation, and then the conversation module 210 may select a response based on the user's emotion condition change, and/or physical status condition change, and/or environment condition change, and/or the rewards of each response calculated by the response learning module 222. For example, the response generation module 220 may generate nine possible chat responses based on the semantic information of the user determined by the semantic information module 212 and corresponding emotion, physical status and environment condition changes respectively determined by the emotion module 214, physical status module 216 and the environment module 218, as well as the user profile 226 of the user. In some examples, the response learning module 222 ranks each possible response to determine the likelihood that the response will either transition a user from one condition to another, e.g., emotion from sad to happy, or will keep the user in a given condition, e.g., stay happy. Based on these rankings, the conversation module 210 may select the appropriate response to be provided to the user.

Figure 3:
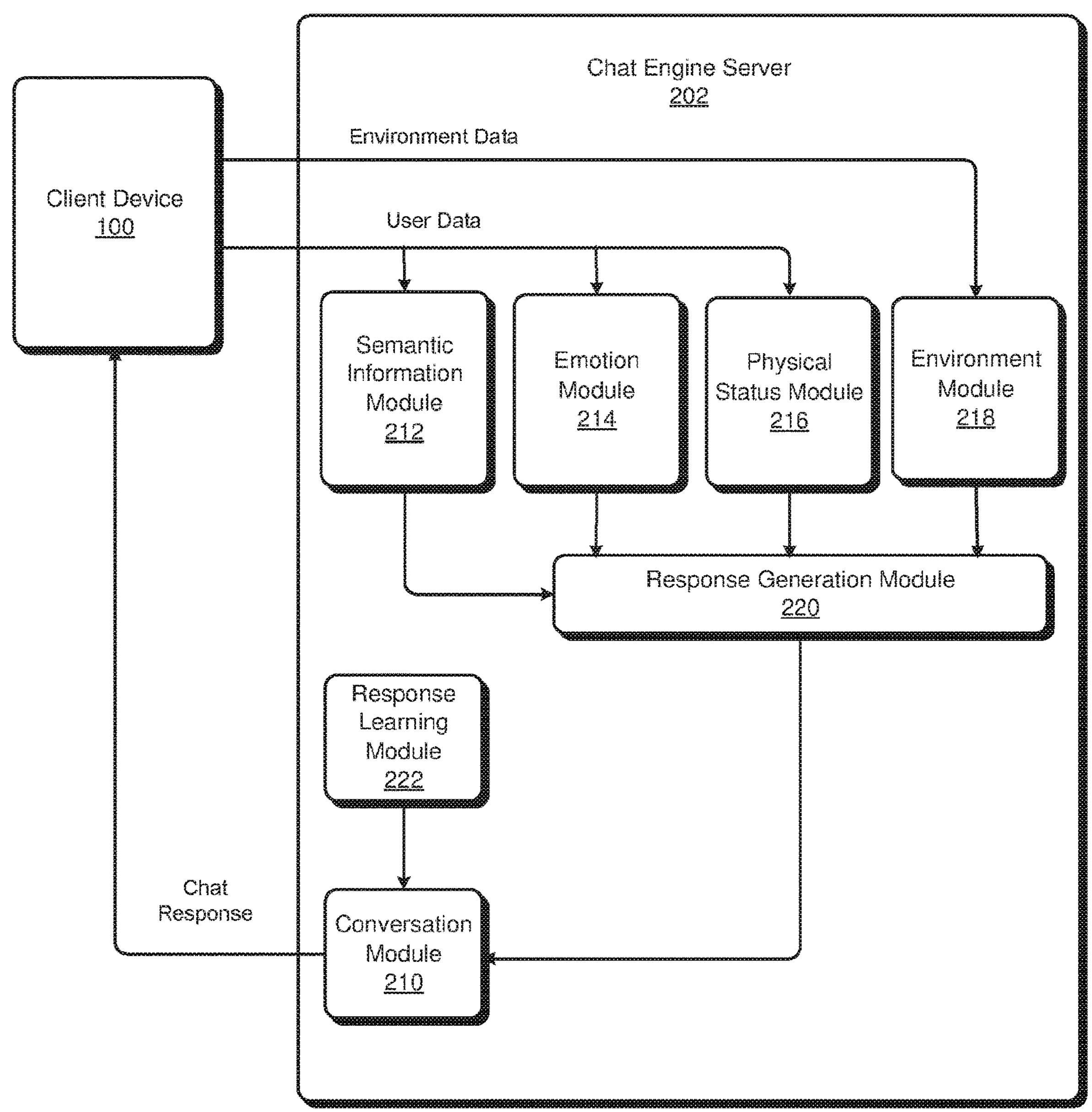
FIG. 3 is a block diagram of a chat engine server providing a chat response to a client device according to an embodiment.

FIG. 3 is a block diagram of a chat engine server 202 providing a chat response to a client device 100 using the response generation module 220 as shown in FIG. 2. The client device 100 provides environment data and user data in a form of sound input to the chat engine server 202. In some examples, the environment data is processed by the environment module 218 to identify the user's particular environment circumstances, e.g., at me, at work, in a bus, on a street, in a car, etc. The user data may include a speech of the user comprising user's semantic information indicating what contents said by the user, emotion condition of the user and physical status condition of the user. In some examples, the semantic information module 212 may process the user data to extract the semantic information; the emotion module 214 may process the user data to determine the user's current emotion condition, e.g., neutral, happy, angry, sad, fear and surprise, etc., and thus the emotion condition change with respect to the previous emotion condition, e.g., from sad to happy, from angry to neutral, etc.; and the physical status module 216 may process the user data to determine the user's current physical status condition and thus the physical status condition change with respect to previous physical status condition. The user data, the environment data, the determined current environment condition, the determined environment condition change, the determined current emotion condition, the determined emotion condition change, the determined current physical status condition, the determined physical status condition change of the user, or any combination thereof may be provided to the response generation module 220 in order to generate one or more chat responses to be provided to the user. If multiple chat responses are generated by the response generation module 220, one preferred chat response may be selected by the conversation module 210 based on the rewards of the multiple responses calculated by the response learning module 222 for either transitioning a user from one emotion condition to another, e.g., cheer the user up, or for ensuring that the provided chat response aligns with the user's current condition, e.g., selection of a response most likely to keep an ecstatic user ecstatic or otherwise happy.

In some examples, to generate chat responses, the illustrated example sequentially processes the semantic information of the user through the response generation module 220. The response generation module 220 may also take into account the determined condition changes of the user, including emotion condition change, physical status condition change, and environment condition change, as determined by the emotion module 214, physical status module 216 and environment module 218, respectively. In some examples, processing by the response generation module 220 stops when one of the components identifies or generates a chat response, and then the conversation module 210 provides the identified or generated chat response to the client device 100. In other examples, possible chat responses are collected from the response generation module 220, and the conversation module 210 selects one to be provided to the client device 100 based on the outcome reward rankings calculated by the response learning module 222. In either scenario, the chat response selected by the conversation module 210 is eventually provided back to the client device 100 for presentation to the user, and the procedure may be repeated throughout a chat conversation.

Figure 4:
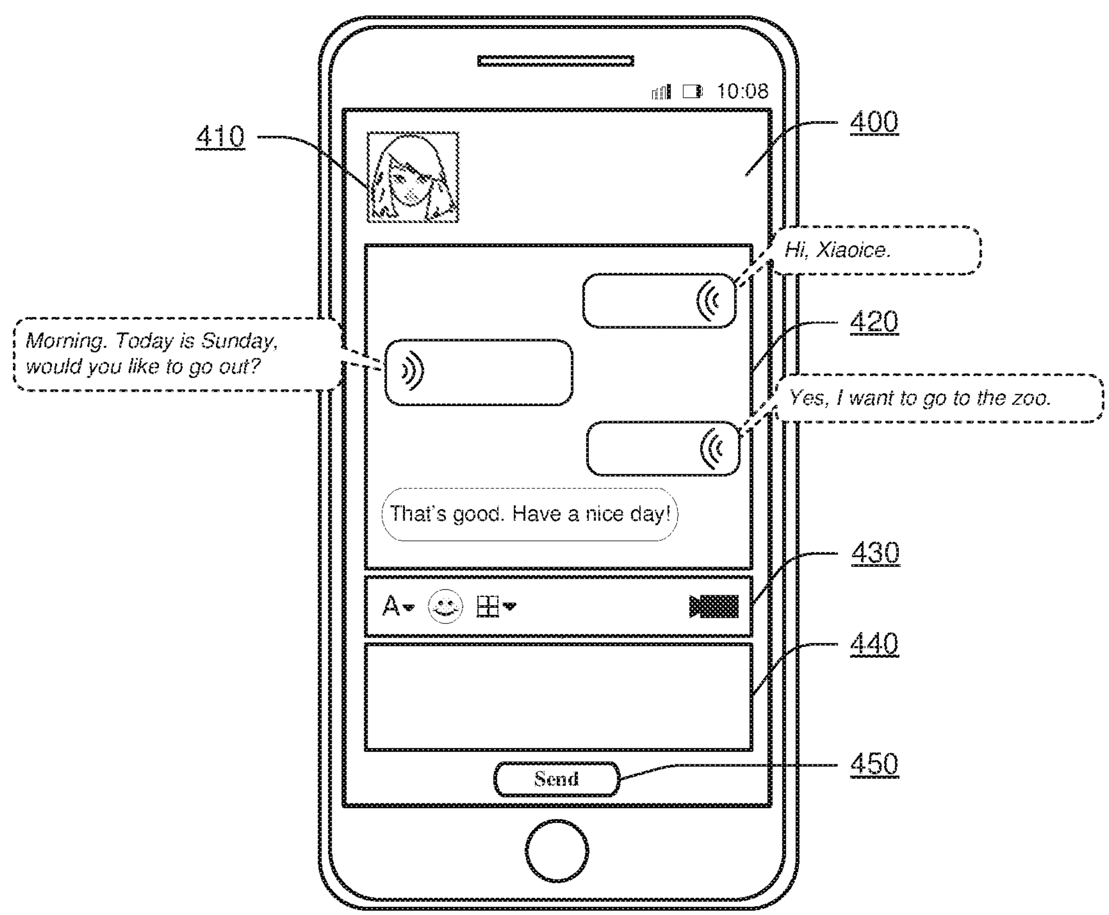
FIG. 4 illustrates an exemplary user interface according to an embodiment.

FIG. 4 illustrates an exemplary user interface 400 according to an embodiment.

The user interface 400 may be included in a terminal device, and may comprise a chatbot icon 410, a presentation area 420, a control area 430 and an input area 440. The chatbot icon 410 may be a photo or picture representing the chatbot, such as logo, name and homepage URL of the chatbot. The presentation area 420 may display a chat window that may contain inputs and responses, in any form of text message, speech message, image message, video message, etc. or any combination thereof, in a conversation between a user and the chatbot. Herein, for the convenience of description, semantic information or content said by the user in an audible sound is shown in a text form in dashed blocks outside the presentation area 420. The control area 430 may include a plurality of virtual buttons for the user to perform message input settings. For example, the user may select to make a speech input, attach image files, select emoji symbols, make a short-cut of the current screen, activate camera, make a speech call or video conversation with the chatbot, etc. through the control area 430. The input area 440 may be used by the user for inputting messages. For example, the user may type text or send speech message through the input area 440. The user interface 400 may further comprise a virtual button 450 for confirming to send the inputted messages. If the user touches the virtual button 450, the messages inputted in the input area 440 may be sent to the presentation area 420.

It should be appreciated that all the elements and their layout shown in FIG. 4 are exemplary. Depending on specific application requirements, the user interface in FIG. 4 may omit or add any elements, and the layout of the elements in the user interface in FIG. 4 may also be changed in various approaches. For example, although the first three messages and responses are shown in a form of speech and the fourth response is shown in a form of text in the presentation area 420, the messages and responses may also be in any other forms or any combination thereof discussed above. Accordingly, the chatbot and the user may make chatting by using any combination of speech, image, text, video in the conversation.

Embodiments of the present disclosure propose methods and apparatus for generating responses based at least on condition change of a user. The condition change of a user may comprises at least one of emotion condition change of the user, physical status condition change of the user and environment condition change. For simplicity, it takes the emotion condition change as an example of all kinds of conditions to set forth the response generation process herein, as illustrated in FIG. 5-FIG. 13. Although there is only shown emotion condition change of the user for generating a response, physical condition change and environment condition change may also be used to generate a response similarly alone or in combination with any one of the above condition change.

Figure 5:
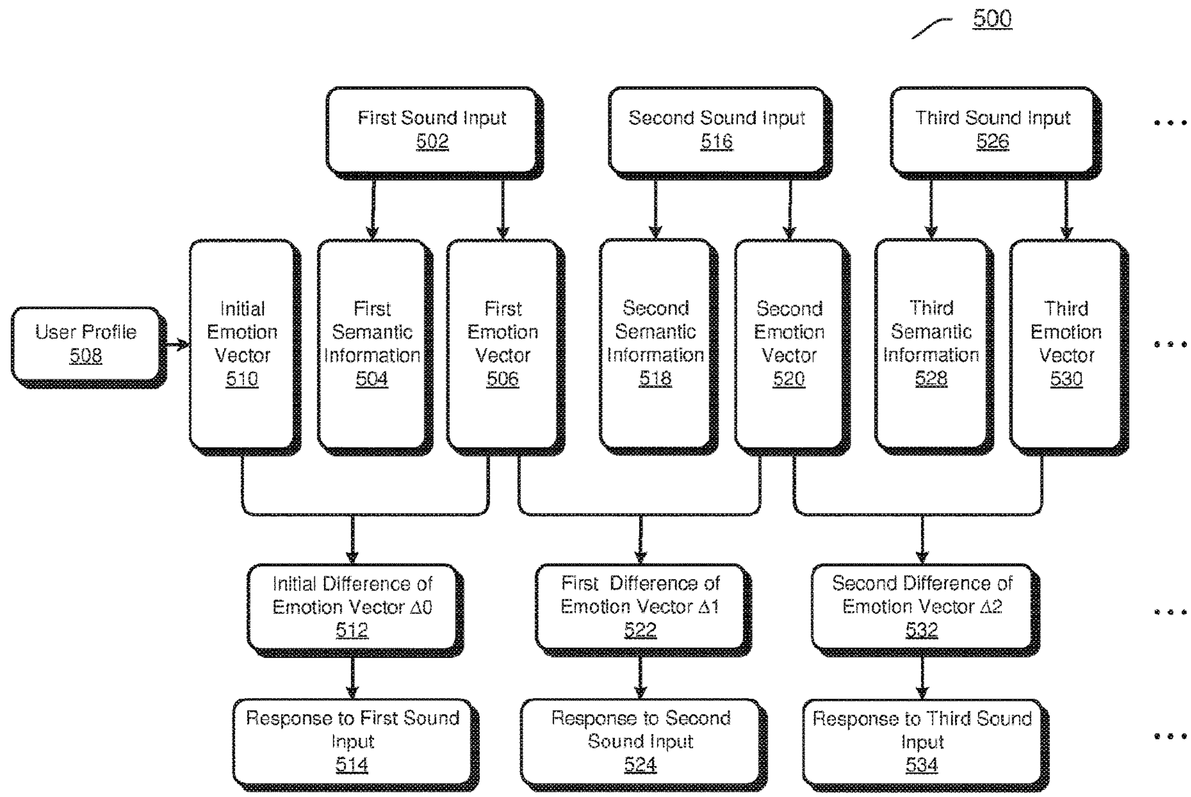
FIG. 5 illustrates an exemplary process for generating responses based at least on an emotion condition change according to an embodiment.

FIG. 5 illustrates an exemplary process 500 for generating responses based at least on an emotion condition change according to an embodiment.

At 502, a first sound input may be received on the client device 100 during a conversation between a user and a chatbot. In some examples, the first sound input may include first user data and/or first environment data. Further, a user's first semantic information, and/or a first emotion condition, and/or a first physical status condition may be extracted from the first user data. In some examples, a first environment condition may be extracted from the first environment data. Herein, for simplicity, the first emotion condition, the first physical status condition and the first environment condition may be collectively referred as a first condition of the user, which can be indicated by a first audio attribute of the first sound input. The first audio attribute may comprise at least one of a first emotion vector indicating the first emotion condition of the user, a first environment vector indicating the first environment condition and a first physical status vector indicating the first physical status condition of the user.

At 504, the first semantic information may be extracted from the first sound input, indicating what contents the user said.

At 506, the first emotion vector is extracted from the first sound input and fed into operation 512, wherein the first emotion vector may indicates a first emotion condition of the user and may be in a form of multi-dimensional emotion vector. In some examples, each dimension in the multi-dimensional emotion vector represents an emotion category respectively.

At 508, a user profile may be accessed and an initial emotion vector of the user may be determined from the user profile, at 510. The initial emotion vector of the user may be in a form of a multi-dimensional emotion vector, represent an initial emotion condition of the user prior to the conversation and also be known as an average emotion vector of the user, a reference emotion vector of the user, and a default emotion vector of the user, etc. In some examples, the initial emotion vector of the user may be updated during or after the conversation based at least on one or more of the emotion vectors extracted during the conversation. In some examples, each dimension in the first multi-dimensional vector of emotion may represent the same emotion category respectively as the ones represented in the initial multi-dimensional vector of emotion.

At 512, based on the initial emotion vector V0 determined at 510 and the first emotion vector V1 extracted at 506, an initial difference of emotion vector Δ0 may be determined by comparing the initial emotion vector V0 and the first emotion vector V1, wherein the initial difference of emotion vector Δ0 may represent an initial condition change between the first emotion condition and the initial emotion condition.

At 514, a response to the first sound input may be generated based at least on the initial difference of emotion vector Δ0. Alternatively or additionally, the response may be generated based on the first semantic information extracted at 504, which is not shown in FIG. 5. Moreover, the response may be generated further based on at least one of the initial emotion condition indicated by the initial emotion vector, the first emotion condition indicated by the first emotion vector, conversation context, user profile, and so on.

At 516, a second sound input may be received on the client device 100 during the conversation. In some examples, the second sound input may include a second user data and/or a second environment data. Further, a user's second semantic information, and/or a second emotion condition, and/or a second physical status condition may be extracted from the second user data. In some examples, a second environment condition may be extracted from the second environment data. Herein, for simplicity, the second emotion condition, the second physical status condition and the second environment condition may be collectively referred as a second condition of the user, which can be indicated by a second audio attribute of the second sound input. The second audio attribute may comprise at least one of a second emotion vector indicating the second emotion condition of the user, a second environment vector indicating the second environment condition and a second physical status vector indicating the second physical status condition of the user.

At 518, the second semantic information may be extracted from the second sound input, which may indicate what contents the user said.

At 520, the second emotion vector may be extracted from the second sound input and fed into operation 522, wherein the second emotion vector may indicate a second emotion condition of the user and may be in a form of multi-dimensional emotion vector. In some examples, each dimension in the second multi-dimensional vector of emotion may represent the same emotion category respectively as the ones represented in the first multi-dimensional vector of emotion.

At 522, based on the second emotion vector extracted at 520 and the first emotion vector extracted at 506, a first difference of emotion vector Δ1 may be determined by comparing the first emotion vector and the second emotion vector, wherein the first difference of emotion vector Δ1 may represent an emotion condition change between the first emotion condition and the second emotion condition.

At 524, a response to the second sound input may be generated based at least on the first difference of emotion vector Δ1. Alternatively or additionally, the response may be generated based on the second semantic information extracted at 518, which is not shown in FIG. 5. Moreover, the response may be generated further based on at least one of the first semantic information extracted at 504, the second emotion condition indicated by the second emotion vector, the first emotion condition indicated by the first emotion vector, conversation context, user profile, and so on.

At 526, a third sound input may be received on the client device 100 during the conversation. In some examples, the third sound input may include a third user data and/or a third environment data. Further, a user's third semantic information, and/or a third emotion condition, and/or a third physical status condition may be extracted from the third user data. In some examples, a third environment condition may be extracted from the third environment data. Herein, for simplicity, the third emotion condition, the third physical status condition and the third environment condition may be collectively referred as a third condition of the user, which can be indicated by a third audio attribute of the third sound input. The third audio attribute may comprise at least one of a third emotion vector indicating the third emotion condition of the user, a third environment vector indicating the third environment condition and a third physical status vector indicating the third physical status condition of the user.

At 528, the third semantic information may be extracted from the third sound input, which may indicate what contents the user said.

At 530, the third emotion vector may be extracted from the third sound input and fed into operation 532, wherein the third emotion vector may indicate a third emotion condition of the user and may be in a form of multi-dimensional emotion vector. In some examples, each dimension in the third multi-dimensional vector of emotion may represent the same emotion category respectively as the one represented in the second multi-dimensional vector of emotion.

At 532, based on the third emotion vector extracted at 530 and the second emotion vector extracted at 520, a second difference of emotion vector Δ2 may be determined by comparing the third emotion vector and the second emotion vector, and represent an emotion condition change between the third emotion condition and the second emotion condition.

At 534, a response to the third sound input may be generated based at least on the second difference of emotion vector Δ2. Alternatively or additionally, the response may be generated based on the third semantic information extracted at 528, which is not shown in FIG. 5. Moreover, the response may be generated further based on at least one of the first semantic information extracted at 504, the second semantic information extracted at 518, the second emotion condition indicated by the second emotion vector, the third emotion condition indicated by the third emotion vector, conversation context, user profile, and so on.

It should be appreciated that although there are three pieces of sound input shown in FIG. 5, there may be fourth sound input, fifth sound input received in the conversation, and so forth, which are not shown for simplicity. It should also be appreciated that although the exemplary embodiments of the present disclosure provide a process for generating responses in a conversation between a user and a chatbot by using emotion condition change of the user, any one of physical status condition change and environment condition change may be implemented in the similar way. In an alternative way, each of emotion condition change, physical status condition change and environment condition change and any combination thereof may be used to generate a response in a conversation. Alternatively or additionally, the response may be generated further based on at least one of an initial condition of the user, a previous condition and current condition of the user, a semantic information of the user extracted from the user data in the sound input, conversation context, user profile, and so on.

In some examples, similar to the update of the initial emotion vector, the initial vector from the user profile, indicating the initial condition of the user, may be updated during or after the conversation to determine a new initial vector for next conversation, based at least on one or more vectors extracted in the conversation. The initial vector herein may include at least one of an initial emotion vector, an initial physical status vector and an initial environment vector. For example, the new initial vector may be calculated by averaging the original initial vector and an average of some or all of vectors in the conversation. The vector herein may include at least one of an emotion vector, a physical status vector and an environment vector. As an alternative way, the original initial vector and an average of some or all of vectors in the conversation may be assigned a respective weight to calculate the new initial vector. It should be appreciated that the new initial vector may be calculated based on the original initial vector and one or more vectors extracted during the conversation by using any available updating method.

Figure 6:
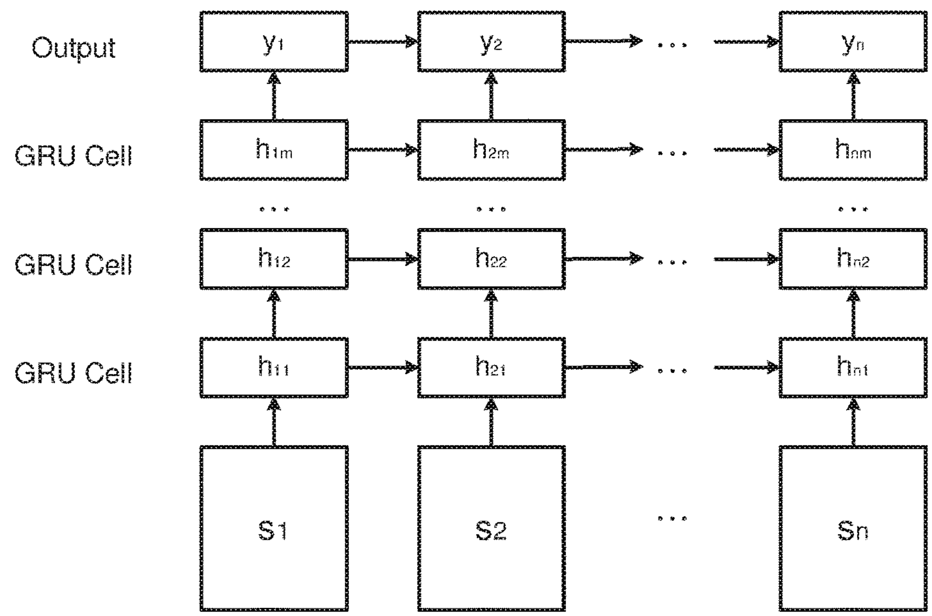
FIG. 6 illustrates an exemplary emotion classification model for extracting emotion vector according to an embodiment.

Continuing to the exemplary emotion condition shown in FIG. 5, FIG. 6 illustrates an exemplary emotion classification model 600 for extracting emotion vector according to an embodiment.

In FIG. 6, a sequence of sound input signal, s1, s2, . . . sn, are provided to the emotion classification model 600, which is implemented using Recurrent Neural Network (RNN), for example, Gated Recurrent Unit (GRU) cell shown in FIG. 6 as an example, Long Short-Term Memory (LSTM), etc. as hidden layers. Multiple hidden layers may be stacked to construct a deep neural network. The output of each sequence may be blocked until the end of sequence (EUS) is reached. Therefore, the final output of the sequence may take all the information of the sequence into account.

The training data of the emotion classification model 600 may be a plurality of speech queries with emotion category label. As an example, there may be six categories of emotion, such as neutral, happy, angry, sad, fear and surprise in training space. For a speech query, the sequence of sound input signal, s1, s2 . . . sn, may be a list of acoustic features extracted from the sound input. The acoustic features may include one or more of loudness, pitch, fundamental frequency, Mel-frequency Cepstral Coefficients (MFCC), formant, glottal wave, short-time energy, zero-crossing rate, short-time magnitude, speed, pause, and so on. In this example, each output, y1, y2 . . . yn, may be labelled as a 6-dimension vector, each dimension representing an emotion category respectively. For example, for a user's speech with happy emotion, the output y may be labelled as [0, 1, 0, 0, 0, 0] where the position of value "1" corresponds to the emotion category "happy"; while for a user's speech with sad emotion, the output y may be labelled as [0, 0, 0, 1, 0, 0] where the position of value "1" corresponds to the emotion category "sad".

In a training phase, cross entropy between the actual label and soft maximization. of the output layer is maximized. During application, the soft maximization operation is removed and then any input speech query will be encoded into a vector, e.g. [0.1, 0.85, 0.01, 0.01 0.02, 0.01]. Each value may be regarded as the likelihood to the corresponding emotion category.

Figure 7:
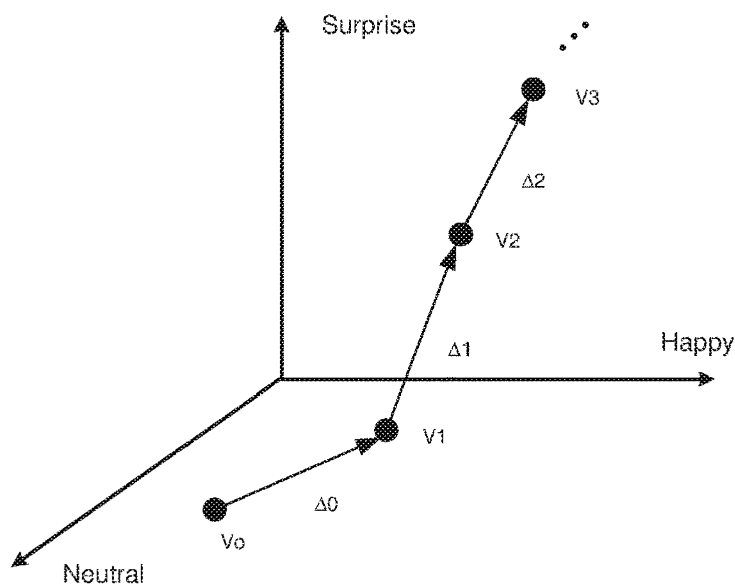
FIG. 7 illustrates an exemplary emotion condition change graph according to an embodiment.

FIG. 7 illustrates an exemplary emotion condition change graph 700 according to an embodiment. As shown in FIG. 7, in this example, V0 represents an initial emotion vector at the beginning of a conversation between a user and a chatbot, which may be determined from a user profile, as that shown at 510 in FIG. 5. V1 represents an emotion vector extracted from a speech message of the user in the conversation by analyzing the above mentioned any acoustic features of the user's speech, such as tone, loudness, pitch and so on, as shown at 506 in FIG. 5. V2 represents an emotion vector extracted from another speech message of the user in the conversation by analyzing the above mentioned any acoustic features of the user's speech, as shown at 520 in FIG. 5. V3 represents an emotion vector extracted from a further speech message of the user in the conversation by analyzing the above mentioned any acoustic features of the user's speech, as shown at 530 in FIG. 5. In this example, Δ0, as illustrated at 512 in FIG. 5, represents a vector difference between V0 and V1, and indicates emotion condition change of the user from an initial emotion condition indicated by V0 to an emotion condition indicated by V1, for example, as shown in FIG. 7, an emotion condition change from "neutral" to "happy". Still in this example, Δ1, as illustrated at 522 in FIG. 5, represents a vector difference between V1 and V2, and indicates emotion condition change of the user from the emotion condition indicated by V1 to an emotion condition indicated by V2, for example, as shown, an emotion condition change from "happy" to "surprise". Similarly, Δ2, as illustrated at 532 in FIG. 5, represents a vector difference between V2 and V3, and indicates emotion condition change of the user from the emotion condition indicated by V2 to an emotion condition indicated by V3, for example, as shown, an emotion condition change from "surprise" to "more surprise". It should be appreciated that, it is only shown 3 dimensions of emotion vector, neutral, happy, surprise, in FIG. 7 for a sake of simplicity; however, there may be 6 dimensions of emotion vector, neutral, happy, angry, sad, fear, surprise, or any multi-dimension of emotion vector in some example of the present disclosure.

Figure 8:
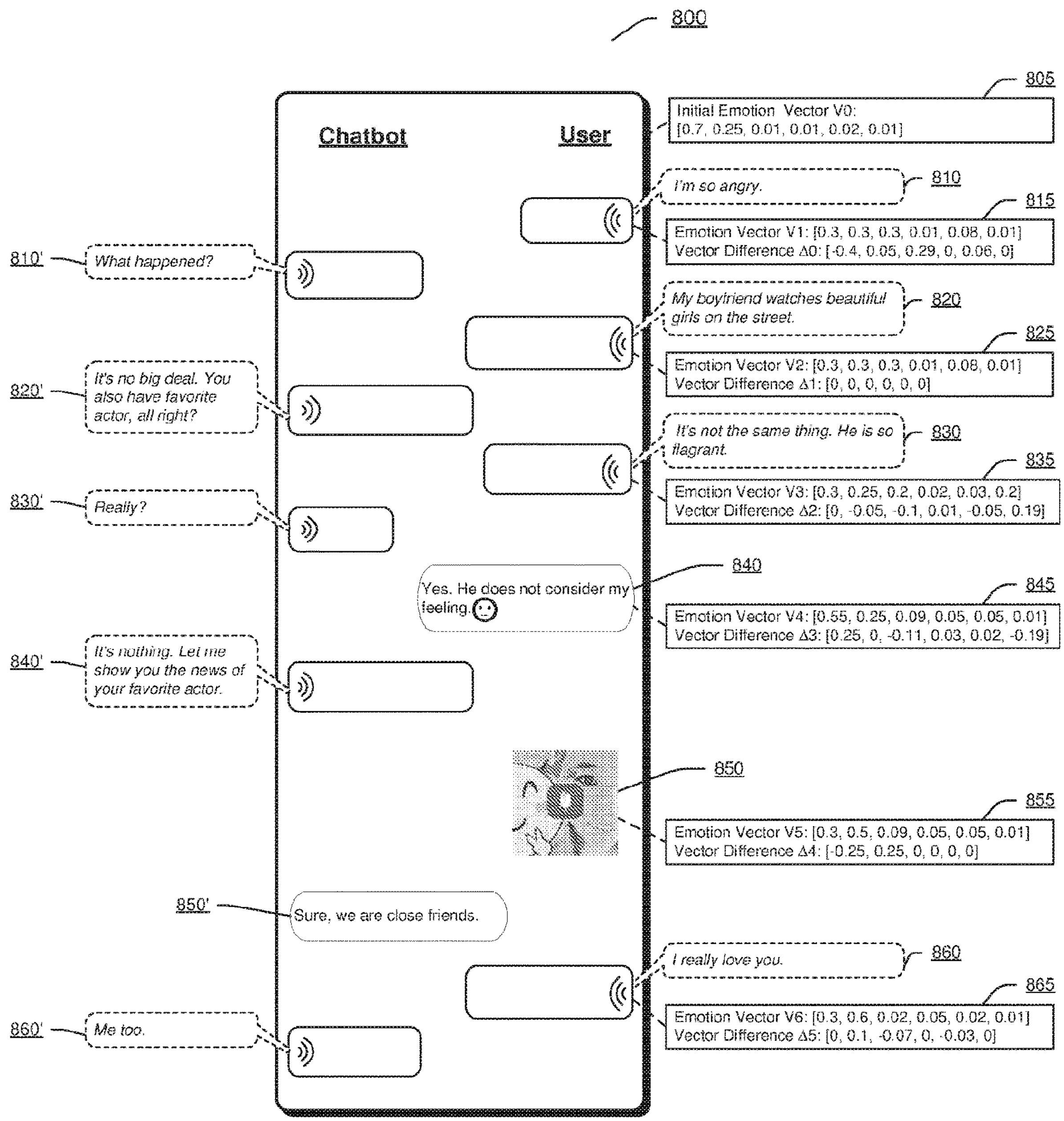
FIG. 8 illustrates an exemplary conversation window for a conversation between a user and a chatbot according to the embodiment in FIG. 5.

According to the exemplary process for generating responses based at least on an emotion condition change in FIG. 5, FIG. 8 illustrates an exemplary conversation window 800 for a conversation between a user and a chatbot according to the embodiment. In the example of FIG. 8, semantic information or content said by the user and the chatbot in each sound input, which may be not visible in the conversation window, is shown in a text form in a dashed block outside the conversation window, for the convenience of description. Also for the convenience of understanding, a description for a multi-dimensional emotion vector of the user in each sound input is shown in a solid block outside the conversation window in the example in FIG. 8.

Before starting the current conversation between the user and the chatbot shown in FIG. 8, the chatbot may determine an initial multi-dimensional emotion vector V0 [0.7, 0.25, 0.01, 0.01, 0.02, 0.01] of the user, for example from a user profile of the user, as shown by 805 in FIG. 8, wherein a number of each dimension in the multi-dimensional emotion vector V0 may be corresponding to a value of an emotion category and the corresponding emotion categories may be [neutral, happy, angry, sad, fear, surprise] in this example. For example, the first number "0.7" indicates a value of an initial emotion "neutral" of the user, the second number "0.25" indicates a value of an initial emotion "happy" of the user, the third number "0.01" indicates a value of an initial emotion "angry" of the user, the fourth number "0.01" indicates a value of an initial emotion "sad" of the user, the fifth number "0.02" indicates a value of an initial emotion "fear" of the user and the sixth number "0.01" indicates a value of an initial emotion "surprise" of the user.

As shown by 810 in FIG. 8, when a sound input, in which the semantic information is "I'm so angry", is received from the user in the conversation, a multi-dimensional emotion vector V1 [0.3, 0.3, 0.3, 0.01, 0.08, 0.01] may be extracted from the sound input through, for example, analysis of the tone of the user's speech by using an emotion classification model 600 as shown in FIG. 6, wherein a number of each dimension in the multi-dimensional emotion vector V1 may indicate a value of an emotion category respectively, for example, the first number "0.3" in V1 indicates a value of an emotion "neutral" of the user, the second number "0.3" in V1 indicates a value of an emotion "happy" of the user, the third number "0.3" in V1 indicates a value of an emotion "angry" of the user, the fourth number "0.01" in V1 indicates a value of an emotion "sad" of the user, the fifth number "0.08" in V1 indicates a value of an emotion "fear" of the user and the sixth number "0.01" in V1 indicates a value of an emotion "surprise" of the user.

By comparing each number in V0 and V1 respectively, for example, by subtracting value of each dimension in V0 from value of corresponding dimension in V1 respectively, a multi-dimensional vector difference Δ0 [31 0.4, 0.05, 0.29, 0, 0.06. 0] may be determined, wherein the first number "−0.4" in Δ0 indicates an amount of emotion change in "neutral" of the user from V0 to V1, the second number "0.05" in Δ0 indicates an amount of emotion change in "happy" of the user from V0 to V1, the third number "0.29" in Δ0 indicates an amount of emotion change in "angry" of the user from V0 to V1, the fourth number "0" in Δ0 indicates an amount of emotion change in "sad" of the user from V0 to V1, the fifth number "0.06" in Δ0 indicates an amount of emotion change in "fear" of the user from V0 to V1, and the sixth number "0" in Δ0 indicates an amount of emotion change in "surprise" of the user from V0 to V1, as shown by 815 in FIG. 8. Although subtraction operation is used herein to get the vector difference, the vector difference may be determined based on the initial vector and first vector by using any possible comparison operation.

According to multi-dimensional vector difference Δ0, the emotion condition change of the user from the initial condition to the current condition may be as follows: neutral decreasing, happy increasing a little, angry increasing a lot, sad remaining unchanged, fear increasing a little, and surprising remaining unchanged. Based at least on the vector difference Δ0, the chatbot may determine that the user is angry now. As an example, taking an emotion category corresponding to a dimension with highest number in the multi-dimensional vector difference as a reference, in this example, which is emotion "angry" corresponding to the third dimension with highest number "0.29" in the multi-dimensional vector difference Δ0, an emotion condition change of the user may be determined, that is, the user may be angry now. Further, at least based on the emotion condition change indicated by the vector difference Δ0, as shown by 810', a response in which the semantic information is "What happened?" to the first sound input may be generated and presented in any form mentioned above of a message, and in this example, it is preferably in a form of speech message. Besides of the emotion condition change, the chatbot may generate such response further based on the semantic information "I'm so angry" of the user in the sound input.

When a sound input in which the semantic information. is "My boyfriend watches beautiful girls on the street", is received from the user, as shown by 820, an emotion vector V2 [0.3, 0.3, 0.3, 0.01, 0.08, 0.01] may be extracted from the sound input shown by 820, and compared with the previous emotion vector V1 to get a vector difference Δ1 [0, 0, 0, 0, 0, 0], as shown by 825 in FIG. 8. From the vector difference Δ1, it may be determined that the emotion condition of the user is not changed, that is, the user is still angry. Therefore, based at least on the vector difference Δ1, as shown by 820', a response in which the semantic information is "It's no big deal. You also have favorite actor, all right?" to the sound input shown by 820 may be generated and presented in any form of a message mentioned above, and herein it is in a form of speech message to be provided to the user.

When a sound input with semantic information is "It's not the same thing. He is so flagrant", is received from the user, as shown by 830, an emotion vector V3 [0.3, 0.25, 0.2, 0.02, 0.03, 0.2] may be extracted from the sound input, and compared with the previous emotion vector V2 [0.3, 0.3, 0.3, 0.01, 0.08, 0.01] to get a vector difference Δ2 [0, −0.05, −0.1, 0.01, −0.05, 0.19], as shown by 835 in FIG. 8. From the vector difference Δ2, it may be derived that the emotion condition of the user is changed to "surprise", that means, the user becomes surprise. Therefore, based at least on the vector difference Δ2, as shown by 830', a response in which the semantic information is "Really?" to the sound input shown by 830 may be generated and presented in any form of a message mentioned above, and herein it is in a form of speech message to be provided to the user.

In a similar way, a vector difference of each turn in the conversation may be determined by comparing the current emotion vector with the previous emotion vector or initial emotion vector. A response may be generated based at least on such vector difference of emotion for each turn in the conversation.

Additionally or alternatively, the user and chatbot may make chatting by using non-speech input, for example, by text, image, emoji, video, etc. or any corribination thereof. For example, as shown by 840 in FIG. 8, an input is received in a form of text "Yes. He does not consider mu feeling" in combination with an emoji. An emotion vector V4 [0.55. 0.25, 0.09, 0.05, 0.05, 0.01] may be extracted from the text input by using any available emotion extraction technique for text. The emotion vector V4 may be compared with the previous emotion vector V3 [0.3. 0.25, 0.2, 0.02, 0.03, 0.2] to get a vector difference Δ3 [0.25, 0, −0.11, 0.03, 0.02, −0.19], as shown by 845 in FIG. 8. From the vector difference Δ3, it may be derived that the emotion condition of the user is changed to "neutral", that means, the user calms down. Therefore, based at least on the vector difference Δ3, as shown by 840', a response in which the semantic information is "It's nothing. Let me show you the news of your favorite actor" to the text input shown by 840 may be generated and presented in any form of a message mentioned above, and herein it is in a form of speech message to be provided to the user.

It should be appreciated that the conversation between a user and a chatbot may be made in any form of text, speech, image, video, etc. or any combination thereof. As an example shown by 850 in FIG. 8, the user may present an image message as an input; and an emotion vector V5 [0.3, 0.5, 0.09, 0.05, 0.05, 0.01] may be extracted from the image message by using any available emotion extraction technique for image, a vector difference Δ4 [−0.25, 0.25, 0, 0, 0, 0] between the emotion vector V5 and the previous emotion vector V4 [0.55, 0.25, 0.09, 0.05, 0.05, 0.01] may be determined, as shown by 855, wherein the vector difference Δ4 may indicate that the emotion condition of the user is changed to happy. A response in which the semantic information is "Sure, we are close friends" may be generated, as shown by 850', based at least on the determined vector difference Δ4. This response may be presented in any form of a message mentioned above, and herein it is in a form of text message to be provided to the user.

Also in this example, the user and the chatbot may continue the conversation in form of speech. As shown by 860 in FIG. 8, a input is received, in which the semantic information is "I really love you" in a form of speech message. An emotion vector V6 [0.3, 0.6, 0.02, 0.05, 0.02, 0.01] may be extracted from the input shown by 860, and compared with the previous emotion vector V5 to get a vector difference Δ5 [0, 0.1, −0.07, 0, −0.03, 0] as shown by 865. According to the vector difference Δ5, it may be determined that the emotion condition of the user is changed to happy, that means, the user becomes happy. Additionally or alternatively, if considering the previous vector difference Δ4, it may further be determined that the user becomes a little happier. Based at least on the vector difference Δ5, a response in which the semantic information is "Me too" to the sound input shown by 860 may be generated and presented to the user in a form of speech message, as shown by 860'.

According to the exemplary emotion condition change of the user shown in FIG. 8, the emotion condition of the user is changed from initial "neutral" as shown by 805, to "angry" as shown by 815, to still "angry" as shown by 825, to "surprise" as shown by 835, to "calming down" as shown by 845, to "happy" as shown by 855 and to "happy" or "a little happier" as shown by 865. Such emotion condition change may be depicted by an emotion condition change graph similar to the graph 700 in FIG. 7.

Additionally or alternatively, there are some cases in which the chatbot may select a response from a response pool based on rules but not using the response generation module, only based on the condition change of the user. For example, when a sound input "He is so bad" with an emotion vector difference [−0.4, −0.2, 0, 0.6, 0, 0] is received, the chatbot may determine that the emotion condition of the user is changed to "sad" and the number "0.6" in the emotion vector difference corresponding to the amount of condition change of emotion "sad" is greater than a predefined threshold. Therefore, the chatbot may select a response "It's not a big deal, I am here" from a response pool based on rules and not use the response generation module or process. Additionally or alternatively, if there are multiple optional responses, a response to be presented to the user may be selected randomly from the multiple optional responses.

Figure 9:
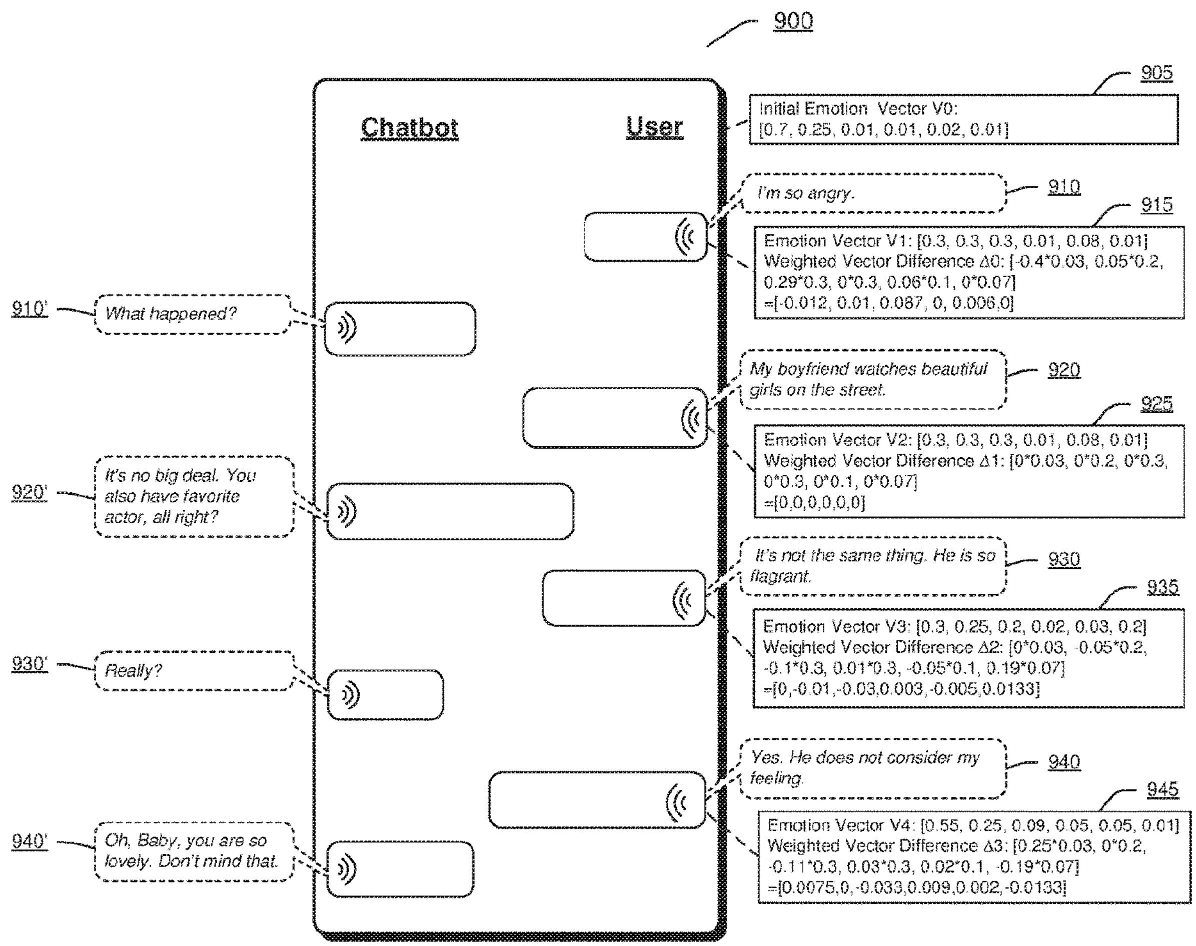
FIG. 9 illustrates another exemplary conversation window for a conversation between a user and a chatbot according to the embodiment in FIG. 5.

As an alternative way, each dimension in the multi-dimensional vector difference of emotion may be assigned a weight respectively, as shown in FIG. 9.

FIG. 9 illustrates another exemplary conversation window 900 between a user and a chatbot according to the embodiment in FIG. 5. In an example of FIG. 9, each dimension in a multi-dimensional vector difference may be assigned a weight, for example, the corresponding weights may be (0.03, 0.2, 0.3, 0.3, 0.1, 0.07) in this example, that is, emotion "neutral" is assigned a weight "0.03", emotion "happy" is assigned a weight "0.2", emotion "angry" is assigned a weight "0.3", emotion "sad" is assigned a weight "0.3", emotion "fear" is assigned a weight "0.1" and emotion "surprise" is assigned a weight "0.07".

Before starting the current conversation between the user and the chatbot shown in FIG. 9, an initial multi-dimensional emotion vector V0 [0.7, 0.25, 0.01, 0.01, 0.02, 0.01] of the user may be determined, for example from a user profile of the user, as shown by 905 in FIG. 9, similar to 805 in FIG. 8.

When a sound input with semantic information "I'm so angry" is received, as shown by 910, an emotion vector V1 [0.3, 0.3, 0.3, 0.01, 0.08, 0.01] may be extracted from the sound input through, for example, analysis of the tone of the user's speech. Therefore, a weighted vector difference Δ0 between V0 and V1 may be [−0.4*0.03, 0.05*0.2, 0.29*0.3, 0*0.3, 0.06*0.1, 0*0.07]=[−0.012, 0.01, 0.087, 0, 0.006, 0] as shown by 915. According to the weight vector different Δ0, the chatbot may determine that the user is angry now. As an example, taking an emotion category corresponding to a dimension with highest number in the weighted multi-dimensional vector difference as a reference, in this example, which is the highest number "0.087" in the weighted vector difference Δ0, which indicates an amount of condition change of emotion "angry", an emotion condition change of the user may be determined, that is, the emotion condition of the user may be changed to angry. Further, at least based on the emotion condition change indicated by the vector difference Δ0, as shown by 910', a response in which the semantic information is "What happened?" to the sound input shown by 910 may be generated and presented in a form of speech message in this example. As an alternative way, besides of the emotion condition change, such response may further generated based on the semantic information "I'm so angry" of the user in the sound input.

A response to a sound input in each turn of the conversation may be generated based at least on a weighted vector difference in a similar way as above. In the example shown in FIG. 9, a sound input in which the semantic information is "My boyfriend watches beautiful girls on the street" is received as shown by 920, an emotion vector V2 [0.3, 0.3, 0.3, 0.01, 0.08, 0.01] is extracted from the sound input shown by 920 and a weighted vector difference Δ1 [0*0.03, 0*0.2, 0*0.3, 0*0.3, 0*0.1, 0*0.07]=[0, 0, 0, 0, 0, 0] is determined as shown by 925, and thus a response in which the semantic information is "It's no big deal. You also have favorite actor, all right?" is generated based at least on the weighted vector difference Δ1 and presented in a form of speech message, as shown by 920'.

Further, a sound input in which the semantic information is "It's not the same thing. He is so flagrant" is received from the user, as shown by 930, an emotion vector V3 [0.3, 0.25, 0.2, 0.02, 0.03, 0.2] may be extracted from the sound input as shown by 930, and a weighted vector difference Δ2 [0*0.03, −0.05*0.2, −0.1*0.3, 0.01*0.3, −0.05*0.1, 0.19*0.07]=[0, −0.01, −0.03, 0.003, −0.005, 0.0133], as shown by 935, and thus a response in which the semantic information is "Really?" to the sound input shown by 930 may be generated and presented in a form of speech message in this example as shown by 930'.

Since each dimension in the weighted multi-dimensional vector difference may have different weight, a weighted vector difference in FIG. 9 may be different from a corresponding vector difference in FIG. 8. For example, taking the sound inputs with the same semantic information "Yes. He does not consider my feeling" and the same emotion vector V4 [0.55, 0.25, 0.09, 0.05, 0.05, 0.01] as shown by 840 and 940 as an example, when receiving this sound input as shown by 840 in FIG. 8, the chatbot may determine that the emotion condition of the user is changed to neutral according to the vector difference Δ3 which is [0.25, 0, −0.11, 0.03, 0.02, −0.19], and generate, as shown by 840', a response in which the semantic information is "It's nothing. Let me show you the news of your favorite actor" to be presented in a form of speech message to the user based at least on an emotion condition change indicated by the vector difference Δ3. However, when receiving this sound input as shown by 940 in FIG. 9, as the emotion "neutral" may be assigned a low weight, such as 0.03, the weighted vector difference Δ3 is [0.25*0.03, 0*0.2, −0.11*0.3, 0.03*0.3, 0.02*0.1, −0.19*0.07]=[0.0075, 0, −0.033, 0.009, 0.002, −0.0133], as shown by 945. According to the weighted vector difference Δ3, the chatbot may determine that the emotion condition of the user may be changed to sad. As shown by 940', a response with semantic information "Oh, Baby, you are so lovely. Don't mind that" may be generated and presented in a form of speech message to the user based at least on an emotion condition change indicated by the weighted vector difference Δ3, which is different with the corresponding response generated in FIG. 8.

It should be appreciated that although the chatbot may determine an emotion condition change according to the weighted multi-dimensional vector difference, for example, based on a dimension with highest weighted value in the weighted multi-dimensional vector difference, it may determine the emotion condition change of the user through other manners, for example, based on a dimension with lowest weighted value in the multi-dimensional vector difference, based on several dimensions with highest weighted value, based on several dimensions with lowest weighted value, based on a dimension or several dimensions with an intermediate value, and so on.

Figure 10:
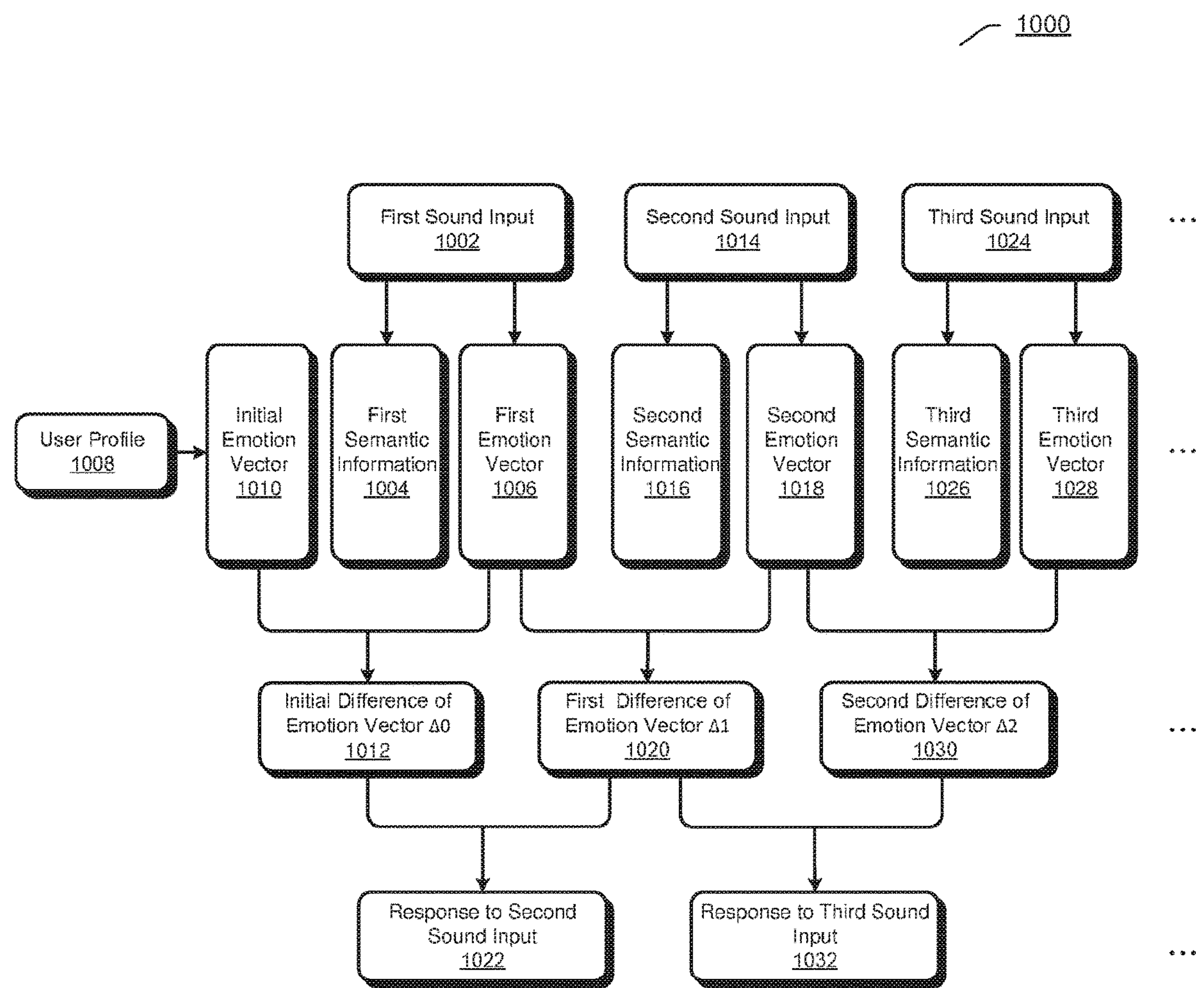
FIG. 10 illustrates another exemplary process for generating a response based at least on an emotion condition change according to an embodiment.

As an alternative way, a response to a sound input may be generated based at least on more than one vector differences, as shown in FIG. 10.

FIG. 10 illustrates another exemplary process 1000 for generating response based at least on an emotion condition change according to an embodiment.

At 1002, a first sound input may be received on the client device 100 during a conversation between a user and a chatbot. In some examples, the first sound input may include first user data and/or first environment data. Further, a user's first semantic information, and/or a first emotion condition, and/or a first physical status condition may be extracted from the first user data. In some examples, a first environment condition may be extracted from the first environment data. Herein, for simplicity, the first emotion condition, the first physical status condition and the first environment condition may be collectively referred as a first condition of the user, which can be indicated by a first audio attribute of the first sound input. The first audio attribute may comprise at least one of a first emotion vector indicating the first emotion condition of the user, a first environment vector indicating the first environment condition and a first physical status vector indicating the first physical status condition of the user.

At 1004, the first semantic information may be extracted from the first sound input, which may indicate what contents the user said.

At 1006, the first emotion vector is extracted from the first sound input and fed into operation 1012, which indicates a firs emotion condition of the user and may be in a form of multi-dimensional emotion vector. In some examples, each dimension in the multi-dimensional emotion vector represents an emotion category respectively.

At 1008, a user profile may be accessed and at 1010, an initial emotion vector of the user may be determined from the user profile. The initial emotion vector of the user may be in a form of a multi-dimensional emotion vector, represent an initial emotion condition of the user and also be known as an average emotion vector of the user, a reference emotion vector of the user, and a default emotion vector of the user, prior to the conversation. In some examples, the initial emotion vector of the user may be updated during or after the conversation based at least on one or more of the emotion vectors extracted during the conversation. In some examples, each dimension in the first multi-dimensional vector of emotion may represent the same emotion category respectively as the ones represented in the initial multi-dimensional vector of emotion.

At 1012, based on the initial emotion vector determined at 1010 and the first emotion vector extracted at 1006, an initial difference of emotion vector Δ0 may be determined by comparing the initial emotion vector and the first emotion vector, which may represent a condition change between the first emotion condition and the initial emotion condition.

At 1014, a second sound input may be received on the client device 100 during the conversation. In some examples, the second sound input may include second user data and/or second environment data. Further, a user's second semantic information, and/or a second emotion condition, and/or a second physical status condition may be extracted from the second user data. In some examples, a second environment condition may be extracted from the second environment data. Herein, for simplicity, the second emotion condition, the second physical status condition and the second environment condition may be collectively referred as a second condition of the user, which can be indicated by a second audio attribute of the second sound input. The second audio attribute may comprise at least one of a second emotion vector indicating the second emotion condition of the user, a second environment vector indicating the second environment condition and a second physical status vector indicating the second physical status condition of the user.

At 1016, the second semantic information may be extracted from the second sound input, which may indicate what contents the user said.

At 1018, the second emotion vector may be extracted from the second sound input and fed into operation 1020, which indicates a second emotion condition of the user and may be in a form of multi-dimensional emotion vector. In some examples, each dimension in the second multi-dimensional vector of emotion may represent the same emotion category respectively as the ones represented in the first multi-dimensional vector of emotion.

At 1020, based on the second emotion vector extracted at 1018 and the first emotion vector extracted at 1006, a first difference of emotion vector $\Delta 1$ may be determined by comparing the first emotion vector and the second emotion vector, which may be fed into operation 1022 and represent an emotion condition change between the first emotion condition and the second emotion condition.

At 1022, a response to the second sound input may be generated based at least on the initial difference of emotion vector $\Delta 0$ and the first difference of emotion vector $\Delta 1$. Alternatively or additionally, the response may be generated based on at least one of the first semantic information extracted at 1004 and the second semantic information extracted at 1016. Moreover, the response may be generated further based on at least one of the first emotion condition indicated by the first emotion vector, the second emotion condition indicated by the second emotion vector, conversation context, user profile, and so on.

At 1024, a third sound input may be received on the client device 100 during the conversation. In some examples, the third sound input may include third user data and/or third environment data. Further, a user's third semantic information, and/or a third emotion condition, and/or a third physical status condition may be extracted from the third user data. In some examples, a third environment condition may be extracted from the third environment data. Herein, for simplicity, the third emotion condition, the third physical status condition and the third environment condition may be collectively referred as a third condition of the user, which can be indicated by a third audio attribute, of the third sound input. The third audio attribute may comprise at least one of a third emotion vector indicating the third emotion condition of the user, a third environment vector indicating the third environment condition and a third physical status vector indicating the third physical status condition of the user.

At 1026, the third semantic information may be extracted from the third sound input, which may indicate what contents the user said.

At 1028, the third emotion vector may be extracted from the third sound input and fed into operation 1030, which indicates a third emotion condition of the user and may be in a form of multi-dimensional emotion vector. In some examples, each dimension in the third multi-dimensional vector of emotion may represent the same emotion category respectively as the ones represented in the second multi-dimensional vector of emotion.

At 1030, based on the third emotion vector extracted at 1028 and the second emotion vector extracted at 1018, a second difference of emotion vector $\Delta 2$ may be determined by comparing the third emotion vector and the second emotion vector, which may be fed into operation 1032 and represent a condition change between the third emotion condition and the second emotion condition.

At 1032, a response to the third sound input may be generated based at least on the first difference of emotion vector $\Delta 1$ and the second difference of emotion vector $\Delta 2$. Alternatively or additionally, the response may be generated based on at least one of the first semantic information extracted at 1004, the second semantic information extracted at 1016, and the third semantic information extracted at 1026. Moreover, the response may be generated further based on at least one of the second emotion condition indicated by the second emotion vector, the third emotion condition indicated by the third emotion vector, conversation context, user profile, and so on.

It should be appreciated that although there are three pieces of sound input shown in FIG. 10, there may be fourth sound input, fifth sound input received in the conversation, and so forth, which are not shown for simplicity. It should also be appreciated that although the exemplary embodiments of the present disclosure provide a process for generating responses in a conversation between a user and a chatbot by using emotion condition change of the user, any one of physical status condition change and environment condition change may be implemented in the similar way. In an alternative way, each of emotion condition change, physical status condition change and environment condition change and any combination thereof may be used to generate a response in a conversation. Alternatively or additionally, the response may be generated further based at least on one of an initial condition of the user, a previous condition and current condition of the user, semantic information of the user extracted from the user data in the sound input, conversation context, user profile, and so on.

Figure 11:
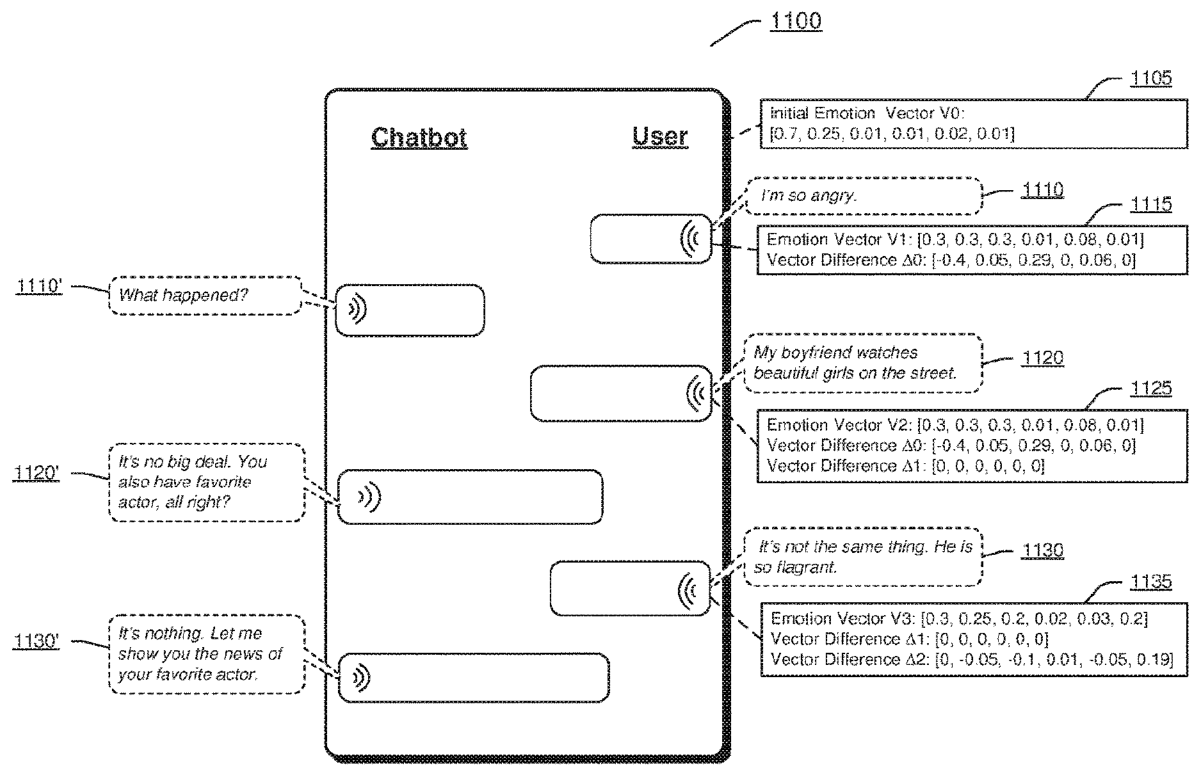
FIG. 11 illustrates an exemplary conversation window for a conversation between a user and a chatbot according to the embodiment in FIG. 10.

FIG. 11 illustrates an exemplary conversation window 1100 for a conversation between a user and a chatbot according to the embodiment in FIG. 10.

In the example of FIG. 11, semantic information or content said by the user and the chatbot in each sound input, which may be not visible in the conversation window, is shown in a text form in a dashed block outside the conversation window, for the convenience of description. Also for the convenience of understanding, a description for a multi-dimensional emotion vector of the user in each sound input is shown in a solid block outside the conversation window in the example in FIG. 11.

As shown in FIG. 11, before starting the current conversation between the user and the chatbot, an initial multi-dimensional emotion vector V0 [0.7, 0.25, 0.01, 0.01, 0.02, 0.01] of the user may be determined, for example from a user profile of the user, as shown by 1105 in FIG. 11, similar to 805 in FIG. 8.

When a sound input with semantic information "I'm so angry" is received from the user in the conversation, as shown by 1110, a multi-dimensional emotion vector V1 [0.3, 0.3, 0.3, 0.01, 0.08, 0.01] may be extracted from the sound input shown by 1110 through, for example, analysis of tone of the user's speech by using an emotion classification model as shown in FIG. 6. By comparing V0 and V1, for example, by subtracting value of each dimension in the initial multi-dimensional emotion vector from value of corresponding dimension in the first multi-dimensional emotion vector respectively, a multi-dimensional vector difference Δ0 [−0.4, 0.05, 0.29, 0, 0.06. 0] may be determined, as shown by 1115, which is similar to 815 in FIG. 8. Based at least on the vector difference Δ0, the chatbot may determine that the user is angry now.

At least based on the emotion condition change indicated by the vector difference Δ0, a response with semantic information "What happened?" to the sound input shown by 1110 may be generated and/or presented in a form of speech message, as shown by 1110'. As an alternative way, besides of the emotion condition change, the chatbot may generate such response further based on semantic information "I'm so angry" of the user in the sound input.

When a sound input with semantic information "My boyfriend watches beautiful girls on the street" is received from the user, as shown by 1120, an emotion vector V2 [0.3, 0.3, 0.3, 0.01, 0.08, 0.01] may be extracted from the second sound input, and compared with the previous emotion vector V1 to get a vector difference Δ1 [0, 0, 0, 0, 0, 0], as shown by 1125 in FIG. 11. Based at least on the vector differences Δ0 and Δ1, it may be derived that the emotion condition of the user is not changed, that is, the user is still angry. Therefore, based at least on the vector differences Δ0 and Δ1, a response with semantic information "It's no big deal. You also have favorite actor, all right?" to the sound input shown by 1120 may be generated and/or presented in a form of speech message to the user, as shown by 1120'. In some examples, when generating response, an average of Δ0 and Δ1 may be used. In some other examples, Δ0 and Δ1 may be assigned respective weight and be used as references to generate a response. For example, Δ1 may have a higher weight than Δ0, since Δ1 may be more associated with the second sound input. It will be appreciated that although an average of Δ0 and Δ1, a weighted Δ0 and a weighted Δ1 may be used as examples to generate the response, Δ0 and Δ1 may be used in any other manners to generate the response.

In a similar way, a sound input with semantic information "It's not the same thing. He is so flagrant" may be received as shown by 1130, an emotion vector V3 [0.3, 0.25, 0.2, 0.02, 0.03, 0.2] may be extracted from the sound input shown by 1130, and compared with the previous emotion vector V2 [0.3, 0.3, 0.3, 0.01, 0.08, 0.01] to get a vector difference Δ2 [0, −0.05, −0.1, 0.01. −0.05, 0.19], as shown by 1135. A response with semantic information "It's nothing. Let me show you the news of your favorite actor" to the sound input shown by 1130 may be generated and/or presented in a form of speech message based at least on Δ1 and Δ2, as shown by 1130' in FIG. 11.

Figure 12:
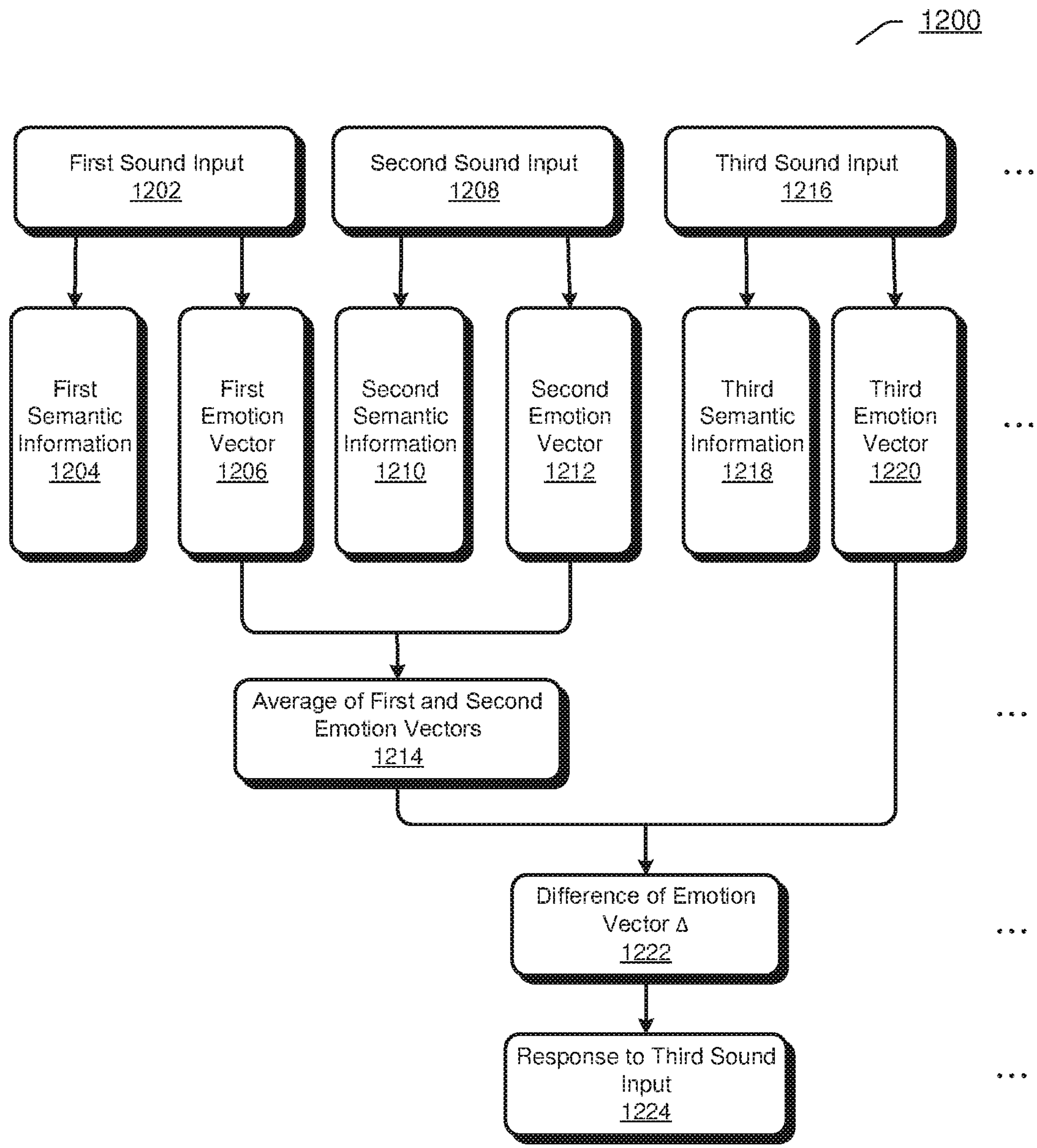
FIG. 12 illustrates an exemplary process for generating a response based at least on an emotion condition change according to an embodiment.

FIG. 12 illustrates an exemplary process 1200 for generating a response based at least on an emotion condition change according to an embodiment, in which the emotion condition change indicated by a difference of emotion vector may be determined by comparing a current emotion vector and an average of previous two or more emotion vectors in the conversation.

At 1202, a first sound input may be received on the client device 100 during a conversation between a user and a chatbot. In some examples, the first sound input may include first user data and/or first environment data. Further, a user's first semantic information, and/or a first emotion condition, and/or a first physical status condition may be extracted from the first user data. In some examples, a first environment condition may be extracted from the first environment data. Herein, for simplicity, the first emotion condition, the first physical status condition and the first environment condition may be collectively referred as a first condition of the user, which can be indicated by a first audio attribute of the first sound input. The first audio attribute may comprise at least one of a first emotion vector indicating the first emotion condition of the user, a first environment vector indicating the first environment condition and a first physical status vector indicating the first physical status condition of the user.

At 1204, the first semantic information may be extracted from the first sound input, which may indicate what contents the user said.

At 1206, the first emotion vector is extracted from the first sound input and fed into operation 1214, which indicates a first emotion condition of the user and may be in a form of multi-dimensional emotion vector. In some examples, each dimension in the multi-dimensional emotion vector represents an emotion category respectively.

At 1208, a second sound input may be received on the client device 100 during the conversation. In some examples, the second sound input may include second user data and/or second environment data. Further, a user's second semantic information, and/or a second emotion condition, and/or a second physical status condition may be extracted from the second user data. In some examples, a second environment condition may be extracted from the second environment data. Herein, for simplicity, the second emotion condition, the second physical status condition and the second environment condition may be collectively referred as a second condition of the user, which can be indicated by a second audio attribute of the second sound input. The second audio attribute may comprise at least one of a second emotion vector indicating the second emotion condition of the user, a second environment vector indicating the second environment condition and a second physical status vector indicating the second physical status condition of the user.

At 1210, the second semantic information may be extracted from the second sound input, which may indicate what contents the user said.

At 1212, the second emotion vector may be extracted from the second sound input and fed into operation 1214, which indicates a second emotion condition of the user and may be in a form of multi-dimensional emotion vector. In some examples, each dimension in the second multi-dimensional vector of emotion may represent the same emotion category respectively as the ones represented in the first multi-dimensional vector of emotion.

At 1214, an average of the second emotion vector extracted at 1212 and the first emotion vector extracted at 1206 may be determined and fed into operation 1222.

At 1216, a third sound input may be received on the client device 100 during the conversation. In some examples, the third sound input may include third user data and/or third environment data. Further, a user's third semantic information, and/or a third emotion condition, and/or a third physical status condition may be extracted from the third user data. In some examples, a third environment condition may be extracted from the third environment data. Herein, for simplicity, the third emotion condition, the third physical status condition and the third environment condition may be collectively referred as a third condition of the user, which can be indicated by a third audio attribute of the third sound input. The third audio attribute may comprise at least one of a third emotion vector indicating the third emotion condition of the user, a third environment vector indicating the third environment condition and a third physical status vector indicating the third physical status condition of the user.

At 1218, the third semantic information may be extracted from the third sound input, which may indicate what contents the user said.

At 1220, the third emotion vector may be extracted from the third sound input and fed into operation 1222, which indicates a third emotion condition of the user and may be in a form of multi-dimensional emotion vector. In some examples, each dimension in the third multi-dimensional vector of emotion may represent the same emotion category respectively as the ones represented in the second multi-dimensional vector of emotion.

At 1222, based on the third emotion vector extracted at 1220 and the average of the first and second emotion vectors determined at 1214, a difference of emotion vector Δ may be determined by comparing the third emotion vector and the average of the first and second emotion vectors, which may represent a condition change between the third emotion condition and an average of the first and the second emotion conditions.

At 1224, a response to the third sound input may be generated based at least on the difference of emotion vector. Alternatively or additionally, the response may be generated based on the third semantic information extracted at 1218. Moreover, the response may be generated further based on at least one of the first semantic information extracted at 1204, the second semantic information extracted at 1210, the first emotion condition indicated by the first emotion vector, the second emotion condition indicated by the second emotion vector, the third emotion condition indicated by the third emotion vector, conversation context, user profile, and so on.

Although a response to the first sound input and a response to the second sound input are not shown in FIG. 12, they may be generated in a manner similar to that shown in FIG. 5 and described above with respect to FIG. 5.

It should be appreciated that although there are three pieces of sound input shown in FIG. 12, there may be fourth sound input, fifth sound input received in the conversation, and so forth, which are not shown for simplicity. It should also be appreciated that although the exemplary embodiments of the present disclosure provide a process for generating responses in a conversation between a user and a chatbot by using emotion condition change of the user, any one of physical status condition change and environment condition change may be implemented in the similar way. In an alternative way, each of emotion condition change, physical status condition change and environment condition change and any combination thereof may be used to generate a response in a conversation. Alternatively or additionally, the response may be generated further based at least on one of an initial condition of the user, a previous condition and current condition of the user, a semantic information of the user extracted from the user data in the sound input, conversation context, user profile, and so on.

Figure 13:
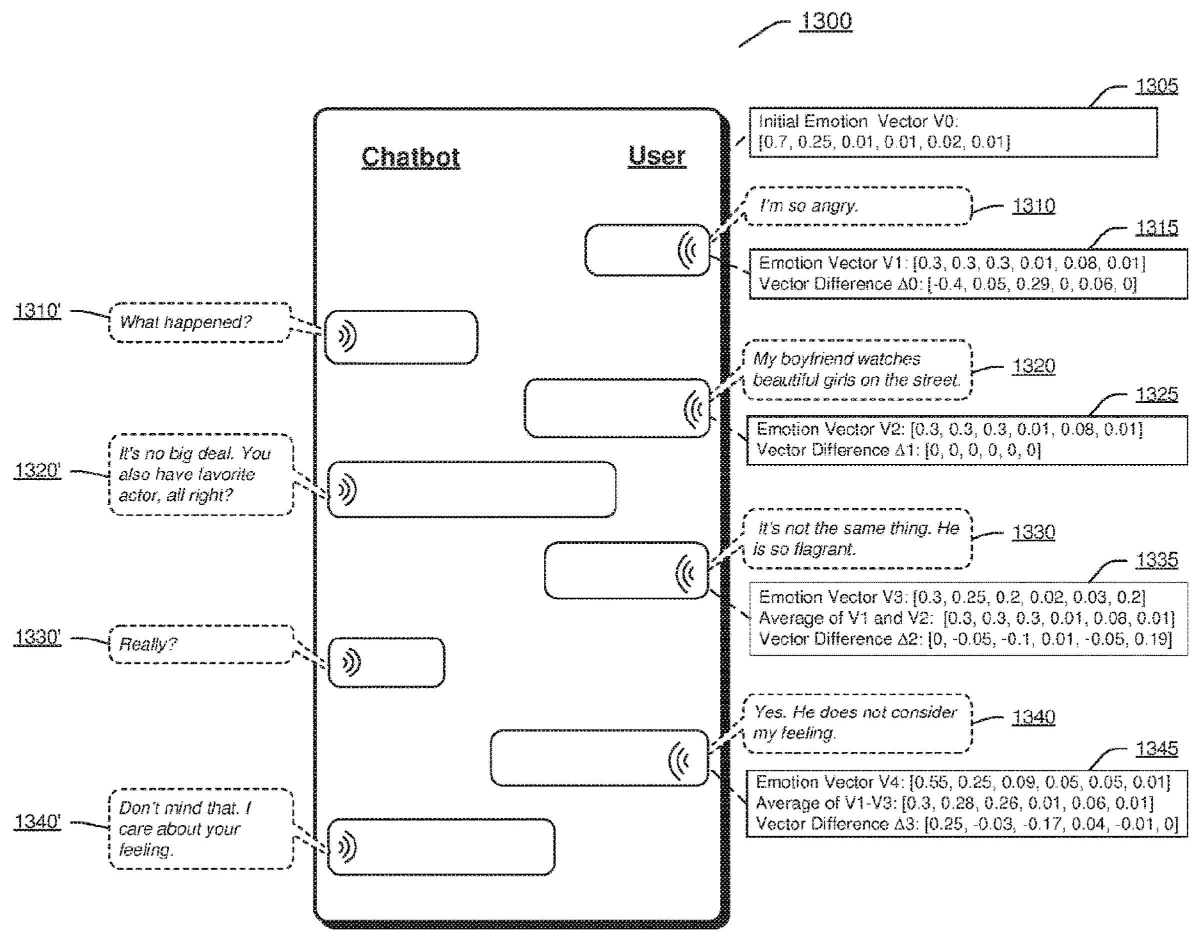
FIG. 13 illustrates an exemplary conversation window for a conversation between a user and a chatbot according to the embodiment in FIG. 12.

FIG. 13 illustrates an exemplary conversation window 1300 for a conversation between a user and a chatbot according to the embodiment in FIG. 12.

In the exemplary conversation window of FIG. 13, there are just shown four sound inputs and corresponding four responses as example, and the semantic information in such four sound inputs are the same as that in FIG. 8. The process for receiving sound input as shown by 1310, 1320, for obtaining or extracting emotion vector as shown by 1305, 1315, 1325 and for generating a response as shown by 1310', 1320' may be similar to that described in FIG. 8, so here the description for the above process may be omitted in FIG. 13, and the process for generating responses as shown by 1330' and 1340' may be described here according to the embodiment in FIG. 13, which may be different from FIG. 8.

When receiving a sound input with semantic information "It's not the same thing. He is so flagrant", as shown by 1330, an emotion vector V3 [0.3, 0.25, 0.2, 0.02, 0.03, 0.2] may be extracted from the sound input, shown by 1330 and an average of the previous emotion vector V1 and the current emotion vector V2 is [0.3, 0.3, 0.3, 0.01, 0.08, 0.01]. A vector difference Δ2 [0, −0.05, −0.1, 0.01, −0.05, 0.19] may be determined by comparing the emotion vector V3 and the average of V1 and V2, as shown by 1335. A response with semantic information "Really?" to the sound input shown by 1330 based at least on the vector difference Δ2 may be generated and/or presented in a form of speech message, as shown by 1330'.

As an alternative way, a vector difference may be determined by comparing a current vector and an average of several previous vectors. For example, as shown in FIG. 13, when receiving a sound input with semantic information "Yes. He does not consider my feeling", as shown by 1340, an emotion vector V4 [0.55, 0.25, 0.09, 0.05, 0,05, 0.01] may be extracted from the sound input shown by 1340 and an average of the emotion vectors V1, V2, V3 may be determined. Thus a vector difference Δ3 [0.25, −0.03, −0.17, 0.04, −0.01, 0] may be determined by comparing the emotion vector V4 with the average of V1, V2, V3 as shown by 1345. A response with semantic information "Don't mind that. I care about your feeling" to the sound input shown by 1340 may then be generated and/or presented in a form of speech message based at least on the vector difference Δ3, as shown by 1340'.

It shall be appreciated that although FIG. 5-FIG. 13 described above take emotion condition change of a user as an example, the condition change of a user may also comprise physical status condition change of a user and environment condition change about the user, and the above processes for generating response based at least on emotion condition change may be also suitable for generating response based at least on physical status condition change, or environment condition change or any combination of emotion condition change, physical status condition change and environment condition change. Following contents may describe an exemplary conversation window considering a combination of the above condition changes, as shown in an example in FIG. 14.

Figure 14:
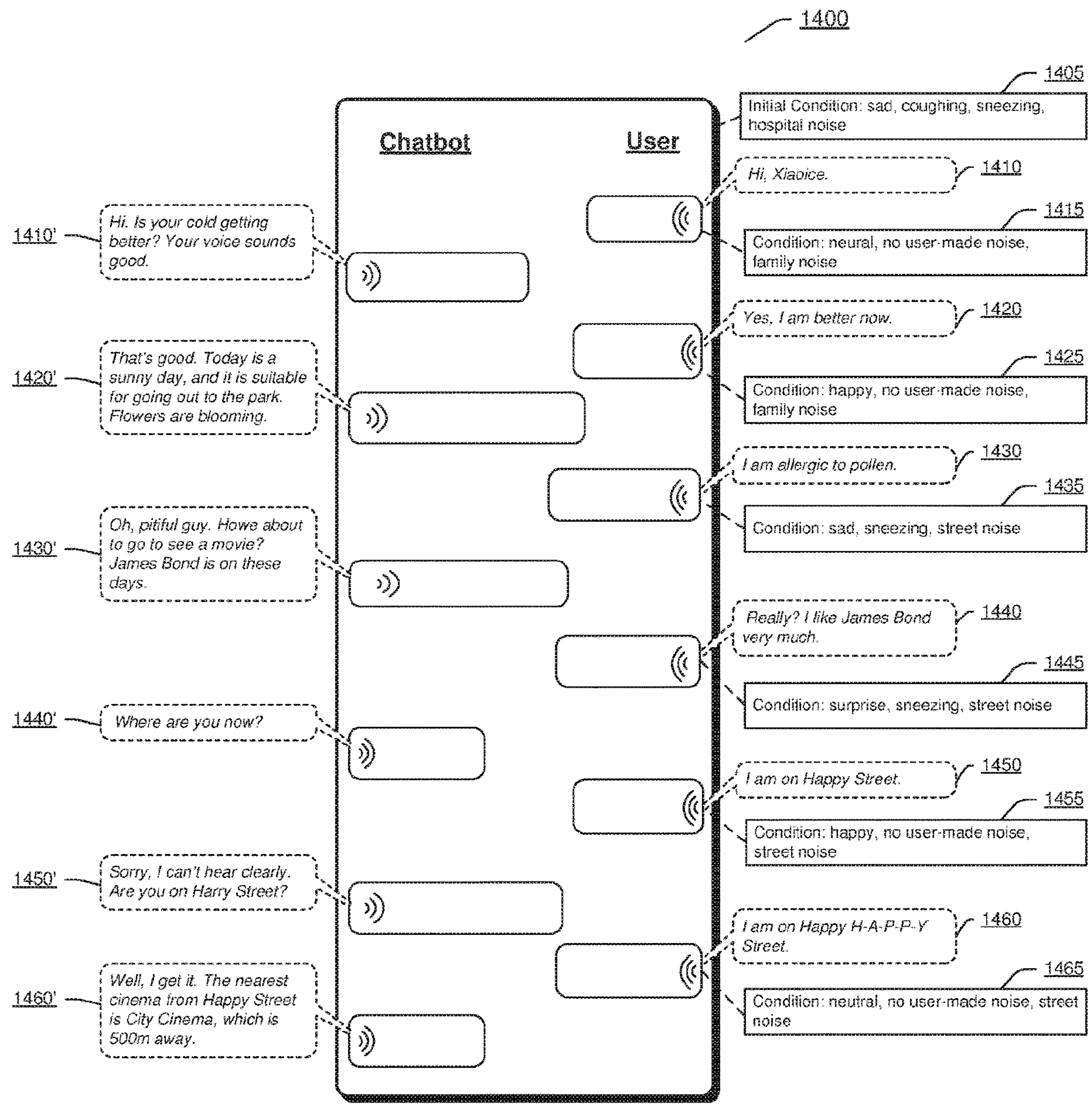
FIG. 14 illustrates an exemplary conversation window for a conversation between a user and a chatbot based at least on an emotion condition change, environment condition change and physical status condition change according to an embodiment.

FIG. 14 illustrates an exemplary conversation window 1400 for a conversation between a user and a chatbot based at least on an emotion condition change, environment condition change and physical status condition change according to an embodiment.

Before starting the current conversation between the user and the chatbot shown in FIG. 14, an initial condition of the user "sad, coughing, sneezing, hospital noise" may be determined, for example from a user profile of the user, as shown by 1405 in FIG. 14. For example, this initial condition may indicate that the user was unhappy, had a cold and went to hospital before this conversation.

When receiving a sound input with semantic information "Hi, Xiaoice" as shown by 1410 and with a condition "neural, no-user made noise, family noise", as shown by 1415, the condition shown by 1415 from this sound input may be extracted. It may be determined that the condition of the user may be changed from "sad, coughing, sneezing, hospital noise" to "neutral, no user-made noise, family noise". Thus a response with semantic information "Hi. Is your cold getting better? Your voice sounds good" may be generated and/or presented in a form of speech message based at least on such condition change of the user from the initial condition shown by 1405 to the condition shown by 1415, as shown by 1410'.

Additionally or alternatively, an initial response may be generated without an initial sound input. For example, the chatbot may obtain user information from the user profile before receiving a sound input, such as the initial condition "sad, coughing, sneezing, hospital noise" and generate a response based at least on such user information to request the user to make a sound input proactively.

When a sound input with semantic information "Yes, I am better now" as shown by 1420 and with a condition "happy, no user-made noise, family noise" as shown by 1425 is received, such condition may be extracted from this sound input and compared with the previous condition to determine a condition change of the user as from "neutral, no user-made noise, family noise" to "happy, no user-made noise, family noise", that means, emotion condition changed from neutral to happy, no change for physical status condition, no change for environment condition. A response with semantic information "That's good. Today is a sunny day, and it is suitable for going out to the park. Flowers are blooming" to the sound input shown by 1420 may thus be generated and/or presented in a form of speech message based at least on the condition change of the user, as shown by 1420'.

In a similar way, when receiving a sound input with semantic information "I am allergic to pollen" as shown by 1430, and with a condition "sad, sneezing, street noise" as shown by 1435, a response with semantic information "Oh, pitiful guy. Howe about to go to see a movie? James Bond is on these days" may be generated and/or presented in a form of speech message, as shown by 1430', based at least on the condition change of the user, for example emotion condition changed from "happy" to "sad", physical status condition changed from "no user-made noise" to "sneezing" and environment condition changed from "family noise" to "street noise". Additionally or optionally, a response may be generated based on the semantic information in the corresponding sound input and/or user profile, conversation context.

Although a sound input with semantic information "Really? I like James Bond very much" as shown by 1440 and with condition "surprise, sneezing, street noise" as shown by 1445 is received, the chatbot may not generate a response to this input and may generate an intermediate message to request other information. In some examples, before receiving a further sound input, the chatbot may generate an intermediate message to request the further sound input or confirm the previous condition of the user., For example, an intermediate message with semantic information "Where are you now?" may be generated, as shown by 1440' to request a further sound input with semantic information "I am on Happy Street" as shown by 1450 and with condition "happy, no user-made noise, street noise" as shown by 1455 from the user. As another example, the chatbot may generate another intermediate message or response with semantic information "Sorry, I can't hear clearly. Are you on Harry Street?" to confirm the previous condition of the user, such as location of the user indicated by the street noise of environment condition, as shown by 1450' in FIG. 14. Then a sound input with semantic information "I am on Happy H-A-P-P-Y Street" as shown by 1460 and with condition "neutral, no user-made noise, street noise" as shown by 1465 may be received and a response with semantic information "Well, I get it. The nearest cinema from Happy Street is City Cinema, which is 500 m away" as shown by 1460' may be generated and/or present in a form of speech message, based at least on the condition change of the user from "happy, no user-made noise, street noise" to "neutral, no user-made noise, street noise", that means, the user's emotion "happy" decreasing to "neutral", the user's physical status and environment around the user remaining unchanged.

It shall be appreciated that although the above described response may be generated based at least on the condition change, the response may be generated further based on at least one of current condition, previous condition(s), current sound input, previous sound input(s), user profile, conversation context and so on.

Figure 15:
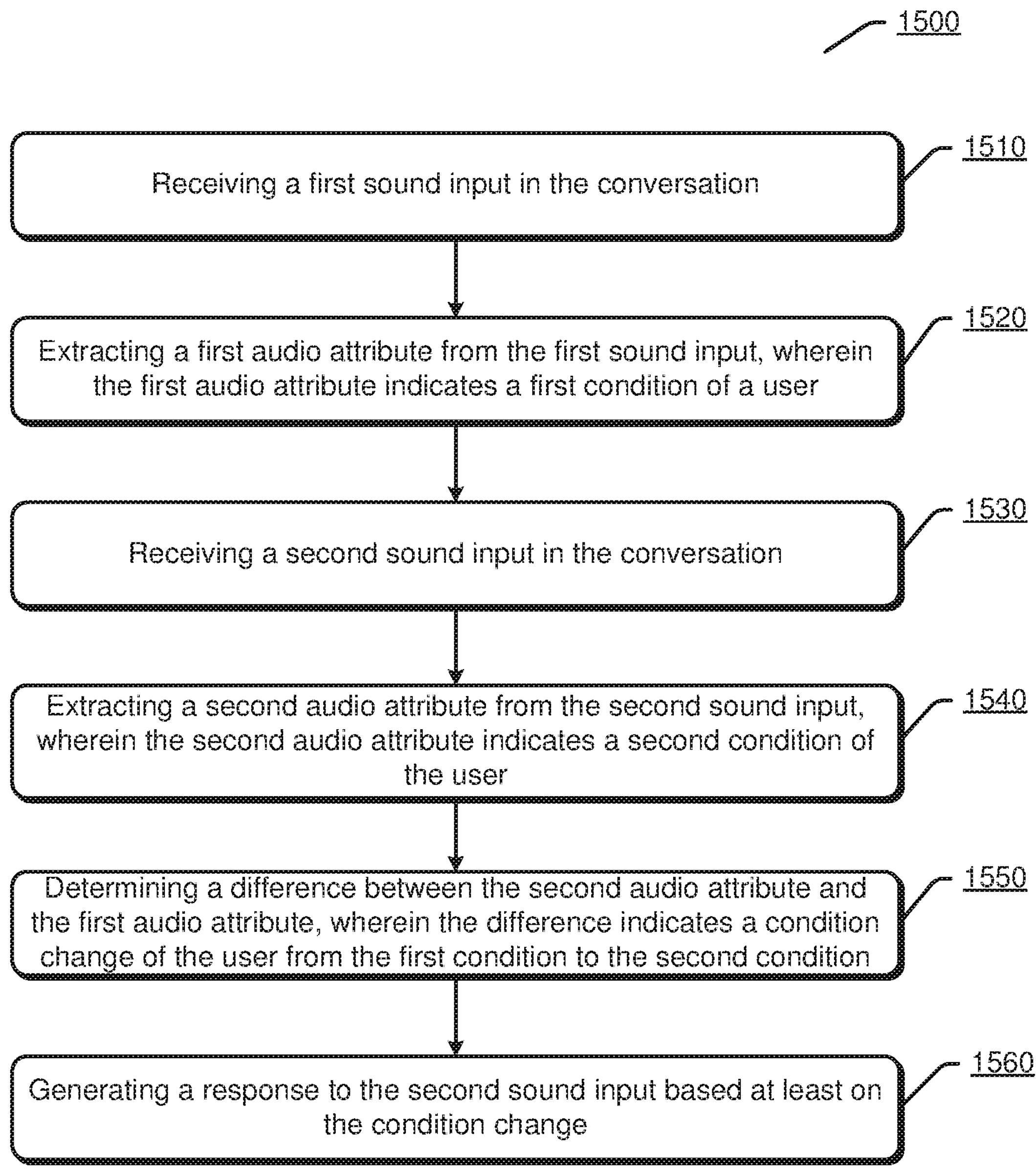
FIG. 15 illustrates a flowchart of an exemplary method for generating a response in a human-machine conversation according to an embodiment.

FIG. 15 illustrates a flowchart of an exemplary method 1500 for generating response in a human-machine conversation according to an embodiment.

At 1510, a first sound input may be received in the conversation.

At 1520, a first audio attribute may be extracted from the first sound input, wherein the first audio attribute may indicate a first condition of a user.

At 1530, a second sound input may be received in the conversation.

At 1540, a second audio attribute may be extracted from the second sound input, wherein the second audio attribute may indicate a second condition of a user.

At 1550, a difference between the second audio attribute and the first audio attribute may be determined, wherein the difference may indicate a condition change of the user from the first condition to the second condition.

At 1560, a response to the second sound input may be generated based at least on the condition change.

In an implementation, the first audio attribute may comprise a first multi-dimensional vector of emotion, wherein each dimension in the first multi-dimensional vector of emotion may represent an emotion category respectively, and the first condition of the user comprises a first emotion condition. In some examples, the second audio attribute may comprise a second multi-dimensional vector of emotion, wherein each dimension in the second multi-dimensional vector of emotion may represent the same emotion category respectively as the ones represented in the first multi-dimensional vector of emotion, and the second condition of the user may comprise a second emotion condition. In some examples, the difference between the second audio attribute and the first audio attribute may comprise a multi-dimensional vector difference between the first multi-dimensional vector of emotion and the second multi-dimensional vector of emotion. In some samples, the condition change may comprise an emotion condition change of the user from the first emotion condition to the second emotion condition.

In an implementation, the method may further comprise assigning a weight to each dimension of the multi-dimensional vector difference, and determining, based on the one or more weighted dimensions of the multi-dimensional vector difference, the emotion condition change of the second emotion condition with respect to the first emotion condition.

In an implementation, the first audio attribute may comprise a first multi-dimensional vector of environment, wherein each dimension in the first multi-dimensional vector of environment may represent an environment category respectively, and the first condition of the user may comprise a first environment condition. In some examples, the second audio attribute may comprise a second multi-dimensional vector of environment, wherein each dimension in the second multi-dimensional vector of environment may represent the same environment category respectively as the ones represented in the first multi-dimensional vector of environment, and the second condition of the user may comprise a second environment condition. In some examples, the difference between the second audio attribute and the first audio attribute may comprise a multi-dimensional vector difference between the first multi-dimensional vector of environment and the second multi-dimensional vector of environment. In some examples, the condition change may comprise an environment condition change of the user from the first environment condition to the second environment condition.

In an implementation, the method may further comprise assigning a weight to each dimension of the multi-dimensional vector difference and determining, based on the one or more weighted dimensions of the multi-dimensional vector difference, the environment condition change of the second environment condition with respect to the first environment condition.

In an implementation, the first audio attribute may comprise a first multi-dimensional vector of physical status, wherein each dimension in the first multi-dimensional vector of physical status may represent a physical status category respectively, and the first condition of the user may comprise a first physical status condition. In some examples, the second audio attribute may comprise a second multi-dimensional vector of physical status, wherein each dimension in the second multi-dimensional vector of physical status may represent the same physical status category respectively as the ones represented in the first multi-dimensional vector of physical status, and the second condition of the user may comprise a second physical status condition. In some examples, the difference between the second audio attribute and the first audio attribute may comprise a multi-dimensional vector difference between the first multi-dimensional vector of physical status and the second multi-dimensional vector of physical status. In some examples, the user condition change may comprise a change of the user from the first physical status condition to the second physical status condition.

In an implementation, the method may further comprise assigning a weight to each dimension of the multi-dimensional vector difference, and determining, based on the one or more weighted dimensions of the multi-dimensional vector difference, the physical status condition change of the second physical status condition with respect to the first environment condition.

In an implementation, the first audio attribute may comprise at least one of a first multi-dimensional vector of emotion, a first multi-dimensional vector of environment and a first multi-dimensional vector of physical status. In some examples, the second audio attribute may comprise at least one of a second multi-dimensional vector of emotion, a second multi-dimensional vector of environment and a second multi-dimensional vector of physical status.

In an implementation, generating the response to the second sound input may be further based on at least one of: the first condition of the user, the second condition of the user, a first semantic information extracted from the first sound input, a second semantic information extracted from the second sound input, a conversation context, and a user profile.

In an implementation, the method may further comprise determining an initial audio attribute of the user from a user profile, wherein the initial audio attribute indicates an initial condition of the user, determining, before receiving the second sound input, a difference between the first audio attribute and the initial audio attribute wherein the difference may indicate an initial condition change of the user from the initial condition to the first condition, and generating response to the first sound input based at least on the initial condition change.

In an implementation, the method may further comprise updating the initial audio attribute of the user based on one or more of the first audio attribute and the second audio attribute.

In an implementation, generating the response to the first sound input may be further based on at least one of: the initial condition of the user, the first condition of the user, a first semantic information extracted from the first sound input, a conversation context, and a user profile.

In an implementation, the method may further comprise determining an initial audio attribute of the user from a user profile, wherein the initial audio attribute indicates an initial condition of the user, determining, before receiving the second sound input, a difference between the first audio attribute and the initial audio attribute wherein the difference may indicate an initial condition change of the user from the initial condition to the first condition, and generating response to the first sound input based at least on the initial condition change.

In an implementation, the method may further comprise updating the initial audio attribute of the user based on one or more of the first audio attribute and the second audio attribute.

In an implementation, generating the response to the first sound input may be further based on at least one of: the initial condition of the user, the first condition of the user, a first semantic information extracted from the first sound input, a conversation context, and a user profile.

In an implementation, the method may further comprise receiving a third sound input in the conversation, extracting a third audio attribute from the third sound input, wherein the third audio attribute indicates a third condition of the user, determining a difference between the third audio attribute and the second audio attribute, wherein the difference may indicate an additional condition change of the user from the second condition to the third condition, and generating a response to the third sound input based at least on the condition change and the additional condition change.

In an implementation, the method may further comprise receiving a third sound input in the conversation, extracting a third audio attribute from the third sound input, wherein the third audio attribute indicates a third condition of the user, determining an average attribute between the first audio attribute and the second audio attribute, wherein the average attribute may indicate an average condition between the first condition and the second condition of the user, determining a difference between the third audio attribute and the average attribute between the first audio attribute and the second audio attribute, wherein the difference may indicate a second condition change of the user from the average condition to the third condition, and generating a third message in response to the third sound input based at least on the second condition change.

In an implementation, the method may further comprise generating, before receiving the first sound input, an initial response based on user information independent of the current conversation, wherein the initial message being a request for the first sound input.

In an implementation, the method may further comprise generating, before receiving the second sound input, an intermediate response for confirming the first condition of the user or for requesting the second sound input.

It should be appreciated that the method 1500 may further comprise any steps/processes for providing a response to a user in a question-answering session according to the embodiments of the present disclosure as mentioned above.

Figure 16:
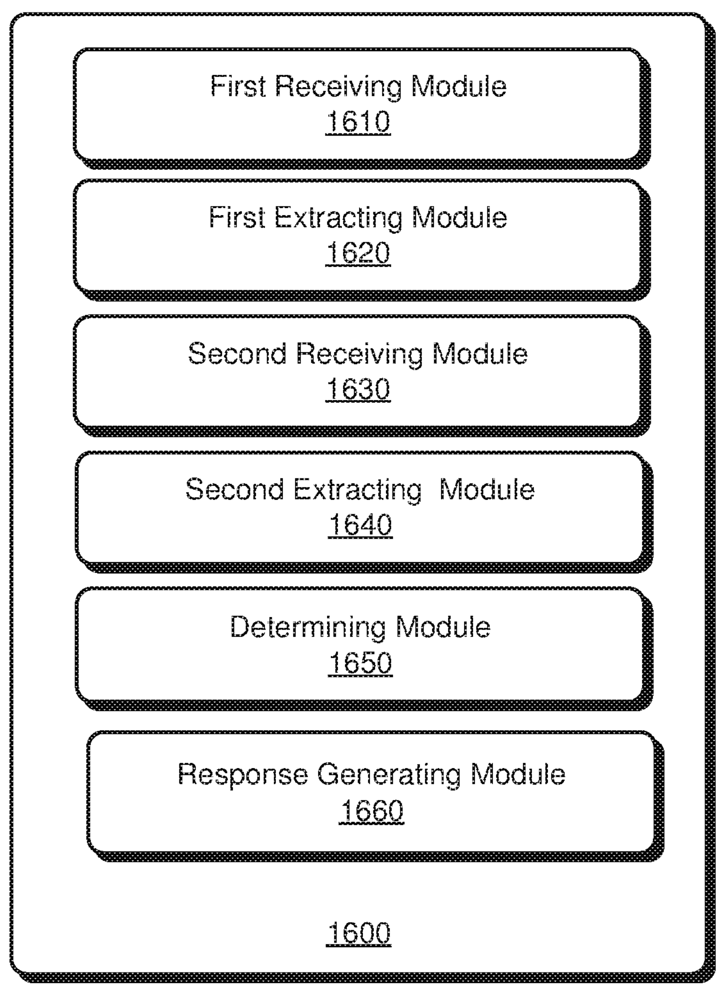
FIG. 16 illustrates an exemplary apparatus for generating a response in a human-machine conversation according to an embodiment.

FIG. 16 illustrates an exemplary apparatus 1600 for generating a response in a human-machine conversation according to an embodiment.

The apparatus 1600 may comprise: a first receiving module 1610, for receiving a first sound input in the conversation; a first extracting module 1620, for extracting a first audio attribute from the first sound input, wherein the first audio attribute may indicate a first condition of a user; a second receiving module 1630, for receiving a second sound input in the conversation; a second extracting module 1640, for extracting a second audio attribute from the second sound input, wherein the second audio attribute may indicate a second condition of a user; a determining module 1650, for determining a difference between the second audio attribute and the first audio attribute, wherein the difference may indicate a condition change of the user from the first condition to the second condition; and a response generating module 1660, for generating a response to the second sound input based at least on the condition change.

In an implementation, the first audio attribute may comprise at least one of: a first multi-dimensional vector of emotion, wherein each dimension in the first multi-dimensional vector of emotion may represent an emotion category respectively; a first multi-dimensional vector of environment, wherein each dimension in the first multi-dimensional vector of environment may represent an environment category respectively; and a first multi-dimensional vector of physical status, wherein each dimension in the first multi-dimensional vector of physical status may represent a physical status category respectively. In some examples, the second audio attribute may comprise at least one of: a second multi-dimensional vector of emotion, wherein each dimension in the second multi-dimensional vector of emotion may represent the same emotion category respectively as the ones represented in the first multi-dimensional vector of emotion; a second multi-dimensional vector of environment, wherein each dimension in the second multi-dimensional vector of environment may represent the same environment category respectively as the ones represented in the first multi-dimensional vector of environment; a second multi-dimensional vector of physical status, wherein each dimension in the second multi-dimensional vector of physical status may represent the same physical status category respectively as the ones represented in the first multi-dimensional vector of physical status. In some examples, the first condition of the user may comprise at least one of: a first emotion condition, a first environment condition, and a first physical status condition. In some examples, the second condition of the user may comprise at least one of: a second emotion condition; a second environment condition, and a second physical status condition. In some examples, the difference between the second audio attribute and the first audio attribute may comprise at least one of: a multi-dimensional vector difference between the first multi-dimensional vector of emotion and the second multi-dimensional vector of emotion; a multi-dimensional vector difference between the first multi-dimensional vector of environment and the second multi-dimensional vector of environment; and a multi-dimensional vector difference between the first multi-dimensional vector of physical status and the second multi-dimensional vector of physical status. In some examples, the condition change may comprise at least one of: an emotion condition change of the user from the first emotion condition to the second emotion condition; an environment condition change of the user from the first environment condition to the second environment condition; and a physical status condition change of the user from the first physical status condition to the second physical status condition.

In an implementation, the determining module 1650 may be further for determining an initial audio attribute of the user from a user profile, wherein the initial audio attribute may indicate an initial condition of the user. The apparatus may further comprise an update module for updating the initial audio attribute of the user based on one or more of the first audio attribute and the second audio attribute.

Moreover, the apparatus 1600 may also comprise any other modules configured for generating a response in a human-machine conversation according to the embodiments of the present disclosure as mentioned above.

Figure 17:
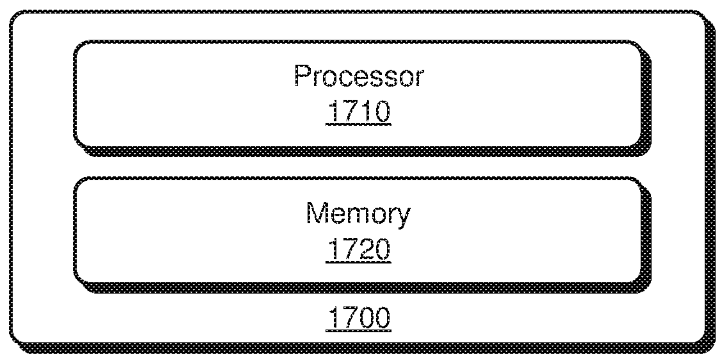
FIG. 17 illustrates an exemplary apparatus for generating a response in a human-machine conversation according to an embodiment.

FIG. 17 illustrates an exemplary apparatus 1700 for generating a response in a human-machine conversation according to an embodiment. The apparatus 1700 may comprise one or more processors 1710 and a memory 1720 storing computer-executable instructions. When executing the computer-executable instructions, the one or more processors 1710 may: receive a first sound input in the conversation; extract a first audio attribute from the first sound input, wherein the first audio attribute may indicate a first condition of a user; receive a second sound input in the conversation; extract a second audio attribute from the second sound input, wherein the second audio attribute may indicate a second condition of a user; determine a difference between the second audio attribute and the first audio attribute, wherein the difference may indicate a condition change of the user from the first condition to the second condition; generate a response to the second sound input based at least on the condition change; and present a message including the generated response to the user in the conservation. In some examples, the apparatus may comprise a storage for storing user profile of the user. As an example, the storage may be a database or tables.

The embodiments of the present disclosure may be embodied in a non-transitory computer-readable medium. The non-transitory computer-readable medium may comprise instructions that, when executed, cause one or more processors to perform any operations of the methods for providing a response to a user in a question-answering session according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device, e.g., hard disk, floppy disk, magnetic strip, an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors, e.g., cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for generating a conversation response during a human-machine conversation, comprising:

receiving a first sound input from a human user in the conversation at a neural network having a plurality of layers at a chat engine;

extracting a first audio attribute from the first sound input, wherein the first audio attribute indicates a first emotion of the user;

receiving a second sound input in the conversation at the neural network;

extracting a second audio attribute from the second sound input, wherein the second audio attribute indicates a second emotion of the user;

determining a difference in emotion between the first audio attribute and the second audio attribute, wherein the difference indicates an emotion change of the user from the first emotion to the second emotion; and generating a conversation response to the second sound input based on the difference in emotion between the first audio attribute and the second audio attribute, for provision by the chat engine to the human user by processing the first audio attribute and the second audio attribute through at least a layer of the plurality of layers of the neural network.

2. The method of claim 1, wherein the first audio attribute comprises a first multi-dimensional vector of emotion wherein each dimension in the first multi-dimensional vector of emotion represents an emotion category respectively;

the second audio attribute comprises a second multi-dimensional vector of emotion, wherein each dimension in the second multi-dimensional vector of emotion represents a same emotion category respectively as ones represented in the first multi-dimensional vector of emotion; and the difference between the second audio attribute and the first audio attribute comprises a multi-dimensional vector difference between the first multi-dimensional vector of emotion and the second multi-dimensional vector of emotion.

3. The method of claim 2, further comprising:

assigning a weight to each dimension of the multi-dimensional vector difference; and determining, based on the one or more weighted dimensions of the multi-dimensional vector difference, the difference in emotion.

4. The method of claim 2, wherein, the first audio attribute comprises a first multi-dimensional vector of physical status, wherein each dimension in the first multi-dimensional vector of physical status represents a physical status category, respectively, and the first emotion of the user comprises a first physical status condition representative of non-speech noise in the first sound input;

the second audio attribute comprises a second multi-dimensional vector of physical status, wherein each dimension in the second multi-dimensional vector of physical status represents a same physical status category respectively as the ones represented in the first multi-dimensional vector of physical status, and the second emotion of the user comprises a second physical status condition representative of non-speech noise in the second sound input;

the difference between the second audio attribute and the first audio attribute comprises a multi-dimensional vector difference between the first multi-dimensional vector of physical status and the second multi-dimensional vector of physical status; and the difference in emotion comprises a physical status change of the user from the first physical status condition to the second physical status condition.

5. The method of claim 4, further comprising:

assigning a weight to each dimension of the multi-dimensional vector difference; and determining, based on the one or more weighted dimensions of the multi-dimensional vector difference, the physical status change of the second physical status condition.

6. The method of claim 2, further comprising:

determining an initial audio attribute of the user from a user profile, wherein the initial audio attribute indicates an initial emotion of the user;

determining, before receiving the second sound input, a difference between the first audio attribute and the initial audio attribute, wherein the difference indicates an initial emotion change of the user from the initial emotion to the first emotion; and generating a response to the first sound input based at least on the initial emotion change.

7. The method of claim 6, further comprising updating the initial audio attribute of the user based on at least one of the first audio attribute and the second audio attribute.

8. The method of claim 6, wherein generating the response to the first sound input is further based on at least one of the initial emotion of the user, the first emotion of the user, a first semantic information extracted from the first sound input, a conversation context, and the user profile.

9. The method of claim 2, further comprising:

receiving a third sound input in the conversation;

extracting a third audio attribute from the third sound input, wherein the third audio attribute indicates a third emotion of the user;

determining a difference between the third audio attribute and the second audio attribute, wherein the difference indicates an additional emotion change of the user from the second emotion to the third emotion; and generating a response to the third sound input based at least on the emotion change and the additional emotion change.

10. The method of claim 1, wherein, the first audio attribute comprises at least one of a first multi-dimensional vector of emotion, a first multi-dimensional vector of environment and a first multi-dimensional vector of physical status; and the second audio attribute comprises at least one of a second multi-dimensional vector of emotion, a second multi-dimensional vector of environment and a second multi-dimensional vector of physical status.

11. The method of claim 1, wherein generating the response to the second sound input is further based on at least one of: the first emotion of the user, the second emotion of the user, a first semantic information extracted from the first sound input, a second semantic information extracted from the second sound input, a conversation context, and a user profile.

12. The method of claim 1, further comprising generating, before receiving the first sound input, an initial message based on user information independent of the conversation, wherein the initial message is a request for the first sound input.

13. The method of claim 1, further comprising generating, before receiving the second sound input, an intermediate response for confirming the first emotion of the user or for requesting the second sound input.

14. An apparatus for generating a conversation response during a human-machine conversation, comprising:

a first receiving module, for receiving a first sound input from a human user in the conversation at a neural network having a plurality of layers at a chat engine;

a first extracting module, for extracting a first audio attribute from the first sound input, wherein the first audio attribute indicates a first emotion condition of the user;

a second receiving module, for receiving a second sound input in the conversation at the neural network;

a second extracting module, for extracting a second audio attribute from the second sound input, wherein the second audio attribute indicates a second emotion of the user;

a module for determining a difference in emotion between the first audio attribute and the second audio attribute, wherein the difference indicates an emotion change of the user from the first emotion to the second emotion; and a response generating module, for generating a conversation response to the second sound input based on the difference in emotion between the first audio attribute and the second audio attribute, for provision by the chat engine to the human user by processing the first audio attribute and the second audio attribute through at a least layer of the plurality of layers of the neural network.

15. The apparatus of claim 14, wherein, the first audio attribute comprises at least one of: a first multi-dimensional vector of emotion, wherein each dimension in the first multi-dimensional vector of emotion represents an emotion category respectively; a first multi-dimensional vector of environment, wherein each dimension in the first multi-dimensional vector of environment represents an environment category respectively; and a first multi-dimensional vector of physical status, wherein each dimension in the first multi-dimensional vector of physical status represents a physical status category respectively, the second audio attribute comprises at least one of: a second multi-dimensional vector of emotion, wherein each dimension in the second multi-dimensional vector of emotion represents a same emotion category respectively as the ones represented in the first multi-dimensional vector of emotion; a second multi-dimensional vector of environment, wherein each dimension in the second multi-dimensional vector of environment represents the same environment category respectively as ones represented in the first multi-dimensional vector of environment; and a second multi-dimensional vector of physical status, wherein each dimension in the second multi-dimensional vector of physical status represents the same physical status category respectively as the ones represented in the first multi-dimensional vector of physical status.

16. The apparatus of claim 15, wherein the determining module is further for determining an initial audio attribute of the user from a user profile, wherein the initial audio attribute indicates an initial emotion of the user; and the apparatus further comprises an update module for updating the initial audio attribute of the user based on at least one of the first audio attribute and the second audio attribute.

17. An apparatus for generating a conversation response during a human-machine conversation, comprising:

one or more processors; and a memory storing computer-executable instructions that, when executed, cause the one or more processors to:

receive a first sound input from a human user in the conversation at a neural network having a plurality of layers at a chat engine;

extract a first audio attribute from the first sound input, wherein the first audio attribute indicates a first emotion of the user;

receive a second sound input in the conversation at the neural network;

extract a second audio attribute from the second sound input, wherein the second audio attribute indicates a second emotion of the user;

determine a difference in emotion between the first audio attribute and the second audio attribute, wherein the difference indicates an emotion change of the user from the first emotion to the second emotion;

generate a conversation response to the second sound input based on the difference in emotion between the first audio attribute and the second audio attribute by processing the first audio attribute and the second audio attribute through at least a layer of the plurality of layers of the neural network; and present a message via the chat engine, including the generated response, to the human user in the conversation.

* * * * *